(12) United States Patent
Patterson

(10) Patent No.: US 6,751,670 B1
(45) Date of Patent: Jun. 15, 2004

(54) TRACKING ELECTRONIC COMPONENT

(75) Inventor: Patrick E. Patterson, Arlington, VA (US)

(73) Assignee: DRM Technologies, L.L.C., Tucson, AZ (US)

( * ) Notice: Subject to any disclaimer, the term of this patent is extended or adjusted under 35 U.S.C. 154(b) by 0 days.

(21) Appl. No.: 09/199,150

(22) Filed: Nov. 24, 1998

(51) Int. Cl.$^7$ ............................................... G06F 15/16
(52) U.S. Cl. ..................... 709/229; 709/206; 705/51; 713/168
(58) Field of Search ................................ 709/219, 206, 709/217, 245, 229, 223, 224, 202, 225; 713/200, 201, 179, 202, 165, 168; 714/38; 380/3, 28; 705/51

(56) References Cited

U.S. PATENT DOCUMENTS

| | | | |
|---|---|---|---|
| 4,471,163 A | 9/1984 | Donald et al. ............ 178/22.08 |
| 4,528,643 A | 7/1985 | Freeny, Jr. ................... 364/900 |
| 4,558,176 A | 12/1985 | Arnold et al. ............ 178/22.08 |
| 4,658,093 A | 4/1987 | Hellman ....................... 380/25 |
| 4,683,553 A | 7/1987 | Mollier ........................... 380/4 |
| 4,796,220 A | 1/1989 | Wolfe ........................... 364/900 |
| 4,999,806 A | 3/1991 | Chernow et al. ........... 364/900 |
| 5,033,084 A | 7/1991 | Beecher .......................... 380/4 |
| 5,057,935 A | * 10/1991 | Williams ..................... 358/402 |
| 5,191,611 A | 3/1993 | Lang ............................. 380/25 |
| 5,337,357 A | 8/1994 | Chou et al. ..................... 380/4 |
| 5,615,264 A | 3/1997 | Kazmierczak et al. ......... 380/4 |
| 5,671,276 A | 9/1997 | Eyer et al. ...................... 380/4 |
| 5,671,279 A | 9/1997 | Elgamal ....................... 380/23 |
| 5,677,953 A | * 10/1997 | Dolphin .......................... 380/4 |
| 5,708,709 A | 1/1998 | Rose ............................... 380/4 |
| 5,708,780 A | 1/1998 | Levergood et al. .... 395/200.12 |
| 5,715,314 A | 2/1998 | Payne et al. .................... 380/4 |
| 5,724,424 A | 3/1998 | Gifford ......................... 380/24 |
| 5,778,173 A | 7/1998 | Apte ....................... 395/187.01 |
| 5,784,460 A | 7/1998 | Blumenthal et al. ........... 380/4 |
| 5,790,790 A | * 8/1998 | Smith et al. ................. 709/206 |
| 5,794,207 A | 8/1998 | Walker et al. ................. 705/23 |
| 5,796,952 A | 8/1998 | Davis et al. ............ 395/200.54 |
| 5,889,943 A | * 3/1999 | Ji et al. ........................ 713/201 |
| 5,958,005 A | * 9/1999 | Thorne et al. .............. 709/202 |
| 5,958,051 A | * 9/1999 | Renaud et al. .............. 713/200 |
| 6,014,688 A | * 1/2000 | Venkatraman et al. ...... 709/206 |
| 6,021,491 A | * 2/2000 | Renaud ....................... 713/179 |
| 6,035,329 A | * 3/2000 | Mages et al. ................ 709/217 |
| 6,073,256 A | * 6/2000 | Sesma .......................... 714/38 |
| 6,075,862 A | * 6/2000 | Yoshida et al. ............... 380/28 |
| 6,178,442 B1 | * 1/2001 | Yamazaki .................... 709/203 |
| 6,192,396 B1 | * 2/2001 | Kohler ........................ 709/206 |
| 6,256,672 B1 | * 7/2001 | Redpath ..................... 709/206 |
| 6,266,692 B1 | * 7/2001 | Greenstein .................. 709/206 |
| 6,289,461 B1 | * 9/2001 | Dixon ......................... 713/201 |
| 6,304,897 B1 | * 10/2001 | Venkatraman et al. ...... 709/206 |
| 6,314,454 B1 | * 11/2001 | Wang et al. ................. 358/402 |
| 6,332,156 B1 | * 12/2001 | Cho et al. ................... 709/203 |
| 6,389,541 B1 | * 5/2002 | Patterson ..................... 705/53 |
| 6,684,248 B1 | * 1/2004 | Janacek et al. ............. 709/225 |

OTHER PUBLICATIONS

InterTrust Technology; http://www.intertrust.com/ technology/tech.html (8 pages).*
InterTrust Technologyies;http://www.intertrust.com technology/rs_howitworks.html (8 pages).*
Netdox Brochure, "Certified Verified Anytime" (12 pages).
Netdox Brochure 1997—Doxit Service Overview (5 pages).

(List continued on next page.)

*Primary Examiner*—Ario Etienne
*Assistant Examiner*—Abdullahi E. Salad
(74) *Attorney, Agent, or Firm*—McGuireWoods LLP

(57) ABSTRACT

A method of tracking electronic content includes producing a file of electronic content and executable instructions that collect notification information and attempt to transmit the notification information to an address when triggered by an event. The executable instructions deny access to the electronic content until the notification information is transmitted successfully.

78 Claims, 19 Drawing Sheets

OTHER PUBLICATIONS

Tumbleweed Software, "POSTA"; http://www.posta.com/posta/posta_overview.htm, (3 pages).

InterTrust Technology "MetaTrust Overview"; http:www.intertrust.com/technology/tech.html (8 pages).

InterTrust Technologies Corporation: Overview: InterTrust Powers The New Digital Economy, A Piece of the Tick—Version 2.0, Oct. 9, 1998 (38 pages).

Sibert et al., DigiBox: A Self–Protecting Container for Information Commerce, Proceedings of the First USENIX Workshop on Electronic Commerce, New York, New York, Jul. 1995 (14 pages).

Vbox White Paper, http://www.previewsystems.com/products/vbox/whitepaper/white_paper.html, (13 pages).

Overview of Release Software's Services (3 pages).

Setting Up a Web Store: A White Paper for Software Resellers; 1997 Release Software Corp.; pp. 1–17 http://www.releasesoftware.com/whitep/resellerwhitepaper.rtf.

Setting Up a Web Store: A White Paper for Software Developers and Publishers; 1997 Release Software Corp.; pp. 1–18; http://www.releasesoftware.com/whitep/isvwhitepaper.rtf.

* cited by examiner

CERTIFIED E-MAIL RECEIPT FORM

ACCESS: AUTHORIZATION FORM

*ENTER YOUR NAME — 335
*ENTER YOUR EMAIL ADDRESS — 340
*ENTER YOUR ORGANIZATION — 345

THE SENDER WILL BE NOTIFIED IMMEDIATELY

SEND

READY — 330

*FIG. 6H*

LOTUS CC:MAIL - [MESSAGE - REGISTERED EMAIL NOTIFICATION]

FILE  EDIT  TEXT  MESSAGE  ATTACHMENTS  TOOLS  WINDOW  HELP

FROM: POSTMASTER@DESKGATE.COM AT INTERNET
TO: RAG AT FR-BOS

□ RECEIPT
☒ LOG
11/17/98
4:55 PM
NORMAL

▲ TEXT ITEM (67 BYTES)

SUBJECT: REGISTERED EMAIL NOTIFICATION

DESKGATE CERTIFIED EMAIL NOTIFICATION

SERIAL #:       2441668DG
TIME STAMP:     111698162130
PACKAGE ID:     SAMPLE.EXE

NAME:           ROB GREENBERG
EMAIL:          GREENBERG@FR.COM
ORGANIZATION:   FISH & RICHARDSON, P.C.

INBOX 0/5 | FOLDERS 2/168 | BBOARD NOTIFY OFF/12 | 11/18/98 10:13 AM

FIG. 61

TRACKING ELECTRONIC COMPONENT

TECHNICAL FIELD

This invention relates to tracking electronic content, for example, content included with or attached to an electronic mail message.

BACKGROUND

Electronic mail (e-mail) enables computer users to conveniently share information. Frequently, however, network packets carrying e-mail are dropped due to network traffic or physical transmission problems. Even when successfully delivered, recipients sometimes delete or otherwise fail to read received e-mail. Thus, a user sending e-mail often cannot not be sure the intended recipient ever read or received the e-mail.

Some e-mail software packages, such as cc:Mail™ available from Lotus™ Corporation of Cambridge, Mass., provide a "return receipt" option when sending e-mail. E-mail software that receives e-mail specifying "return receipt" can automatically send back a receipt message indicating that the intended recipient received the e-mail. Some software packages permit an administrator or user to disable "return receipt" functions and, thus, prevent transmission of receipts back to e-mail senders.

E-mail contents can include text messages entered in an e-mail editor and/or attachment files (attachments). Recent surveys indicate that more than 50% of information transmitted via e-mail is transmitted in the form of attachments. Many e-mail software packages enable a user receiving an e-mail attachment to easily forward received attachments to other recipients. Thus, an attachment may be quickly disseminated to a large number of individuals unknown to the user originally sending the attachment.

SUMMARY OF THE INVENTION

In general, in one aspect, a method of tracking electronic content includes producing a file that includes electronic content and executable instructions. The executable instructions collect notification information and attempt to transmit the notification information to an address when triggered by an event. The executable instructions deny access to the electronic content until the notification information is transmitted successfully.

Embodiments may include one or more of the following. The executable instructions may deny access until an access granting message is received in response to the successful transmission of notification information. The trigger event may include an attempt to access (e.g., view, use, or list) the electronic content, for example, from a computer or user that has not previously accessed the electronic content.

The executable instructions may collect notification information by querying a computer and/or interactively collecting information from a user. Such information may include demographic information (e.g., a name, an e-mail address, and an organization identifier) or system information (e.g., a network address).

The electronic content may be encrypted. Encrypted content may be accompanied by instructions decrypt the content. The electronic content may be compressed. Compressed content may be accompanied by instructions that decompress the content. The electronic content may include at least one file of data, text, graphics, audio, video, or an executable instructions. The file may be transmitted via e-mail (e.g., as an e-mail attachment).

The method may further include determining an address to receive the notification information. Such determining may performed by interactively receiving an address from a user. Such determining also may be determined by automatically identifying the address as the address of the user creating the file.

The executable instructions that transmit notification information may dynamically determine how to transmit the notification information via an intermediate device (e.g., a proxy server and a firewall).

In general, in another aspect, a method of tracking access to electronic content includes encrypting electronic content, determining an address for receipt of notification information, and producing a file that includes the encrypted electronic content, and executable instructions. The executable instructions collect notification information and attempt to transmit the notification information to the determined address in response to an attempt to access the electronic content on a computer that has not previously accessed the electronic content. The notification instructions decrypt the encrypted electronic content after transmitting notification information successfully.

In general, in another aspect, a method for tracking access to electronic content includes receiving notification information from a recipient of a file including electronic content, the notification information being transmitted in response to an attempt to access the electronic content. The notification information includes an identifier that identifies a user or computer system. The method also includes determining an address for receipt of the notification information and transmitting the notification information to the determined address.

Embodiments may include one or more of the following. An access granting message may be transmitted. The identifier that identifies a user or computer system included in the notification information may be used to verify that an authorized user produced the file. The identifier may also be used to update information (e.g., a usage charge) corresponding to the identifier.

In general, in another aspect, a computer-implemented method of regulating access to electronic content includes collecting notification information in response to an attempt to access the electronic content, attempting to transmit the collected notification information to an address, and selectively granting access to the electronic content based on a result of the attempted transmission of the notification information.

In general, in another aspect, a method of tracking access to electronic content includes creating a file that includes electronic content and causes access to the electronic content to be denied until notification information has been successfully transmitted. The method also includes transmitting the file to a set of addresses that includes at least one address and receiving notification information.

In general, in another aspect, a computer-implemented method of regulating access to e-mail includes detecting an attempt by a message recipient to access received e-mail, attempting to collect notification information from the recipient, and selectively granting access to the e-mail based on a result of the attempt to collect notification information.

In general, in another aspect, a computer program, disposed on a computer readable medium, tracks electronic content. The computer program including computer program instructions for causing a computer to produce a file that includes electronic content and executable instructions that collect notification information and attempt to transmit the notification information to an address when triggered by an event. The executable instructions deny access to the electronic content until the notification information is transmitted successfully.

In general, in another aspect, a computer program, disposed on a computer readable medium, regulates access to electronic content. The computer program includes instructions for causing a processor to collect notification information in response to an attempt to access the electronic content, attempt to transmit the collected notification information to an address, and selectively grant access to the electronic content based on a result of the attempted transmission of the notification information.

Advantages include one or more of the following.

Transmitting electronic content in envelopes permits access to electronic content to be tracked in perpetuity. That is, regardless of how an envelope is passed on by different recipients, the envelope creator, or a user designated by the envelope creator, receives notification information describing each recipient who attempts to access the electronic content in the envelope.

By including its own set of executable instructions the envelope can be used by existing e-mail software packages without modification. Additionally, the executable instructions, for example, those that dynamically determine how to reach a network through intermediate devices (e.g., a firewall), make the task of preventing transmission of notification information extremely difficult without completely severing a network connection.

The notification information provided by an envelope can include any information that can be acquired by querying a computer system or user. The information collected can provide valuable marketing data describing the attributes of users accessing the electronic content.

Receipt of notification information not only communicates receipt of a file but also of attempted access or other attempted functions (e.g., printing, saving, and deleting).

The use of a notification server enables envelopes to control access to electronic content, for example, by limiting the number of times a particular user can access electronic content.

Other advantages of the invention will become apparent in view of the following description, including the figures, and the claims.

DESCRIPTION OF THE DRAWINGS

FIGS. 6A–6J are screenshots of envelope creation and use.

DETAILED DESCRIPTION

Figure 1:
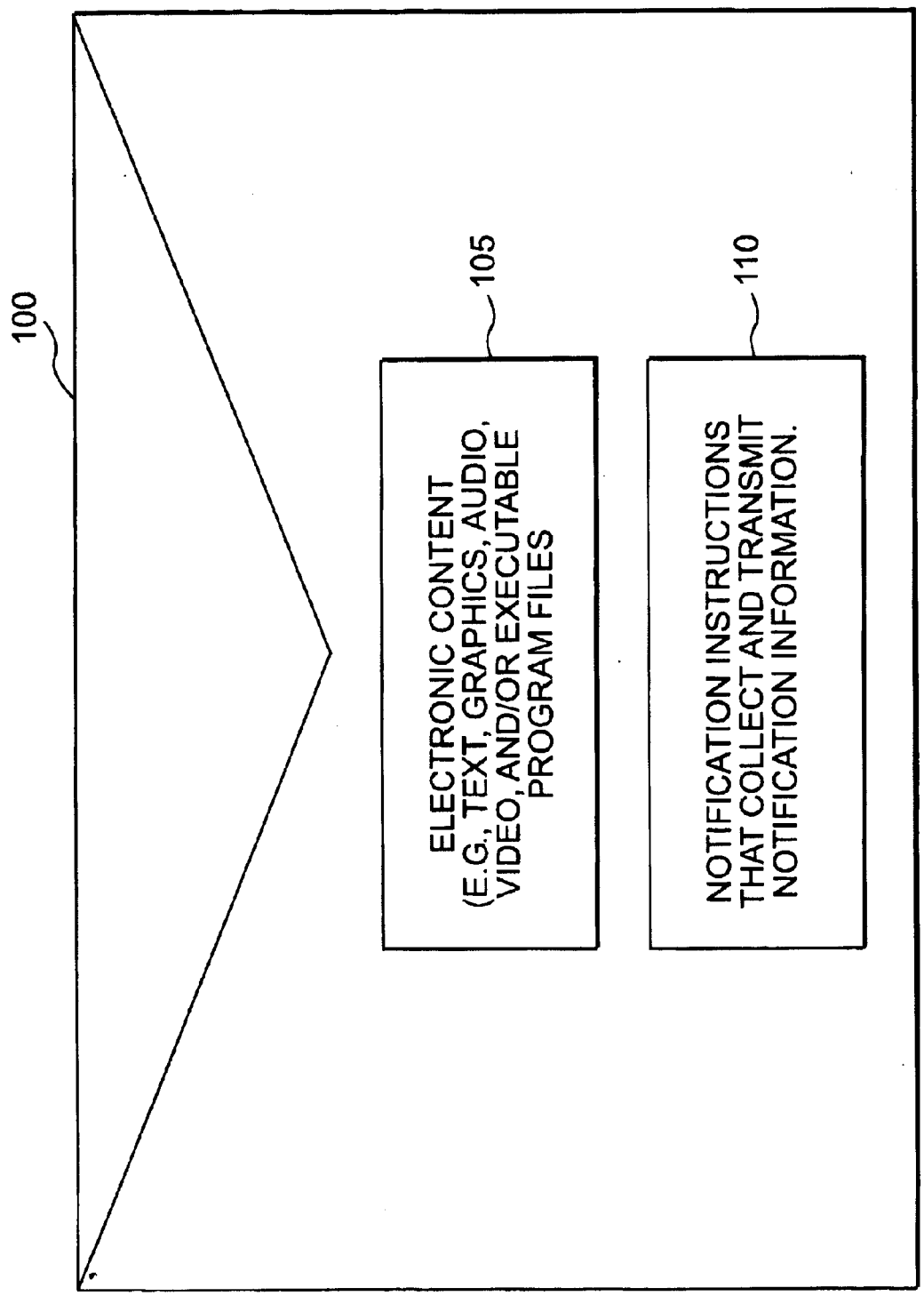
FIG. 1 is a diagram of an envelope.

Referring to FIG. 1, an envelope file 100 (envelope) includes electronic content 105 (e.g., data, text, graphics, audio, video, or executable instructions) and executable notification instructions 110 that control and report access to the electronic content 105. The envelope file 100 may be transmitted to other users or computers, for example, as an attachment to an e-mail message. The envelope 100 may also be transmitted via a network service such as FTP (File Transfer Protocol) or HTTP (HyperText Transfer Protocol) or other mechanisms such as physical transfer of a floppy disk storing the envelope or a direct modem connection between computers. A recipient of the envelope 100 may attempt to access (e.g., view, use, or list) content 105 included in the envelope 100. The notification instructions 110 included in the envelope 100 may respond to the access attempt by collecting notification information (e.g., a user name) and attempting to transmit the collected information to a network address designated during envelope 100 creation. The notification instructions 110 may be configured during creation of the envelope 115 to grant or deny access to the electronic content 105 based on the results of the attempted transmission of the notification information 140.

The executable notification instructions 110 included in an envelope 100 may include computer platform-specific instructions. For example., an envelope 100 may include binary instructions 110 that program any PC-compatible computer. The executable instructions, however, need not be targeted to a particular computer platform. For example, the instructions 110 may be Java commands. The executable instructions are placed in the envelope 100 such that an attempt to execute the envelope file 100 (e.g., "C:\envelope.exe") causes execution of the executable instructions.

Figure 2A:
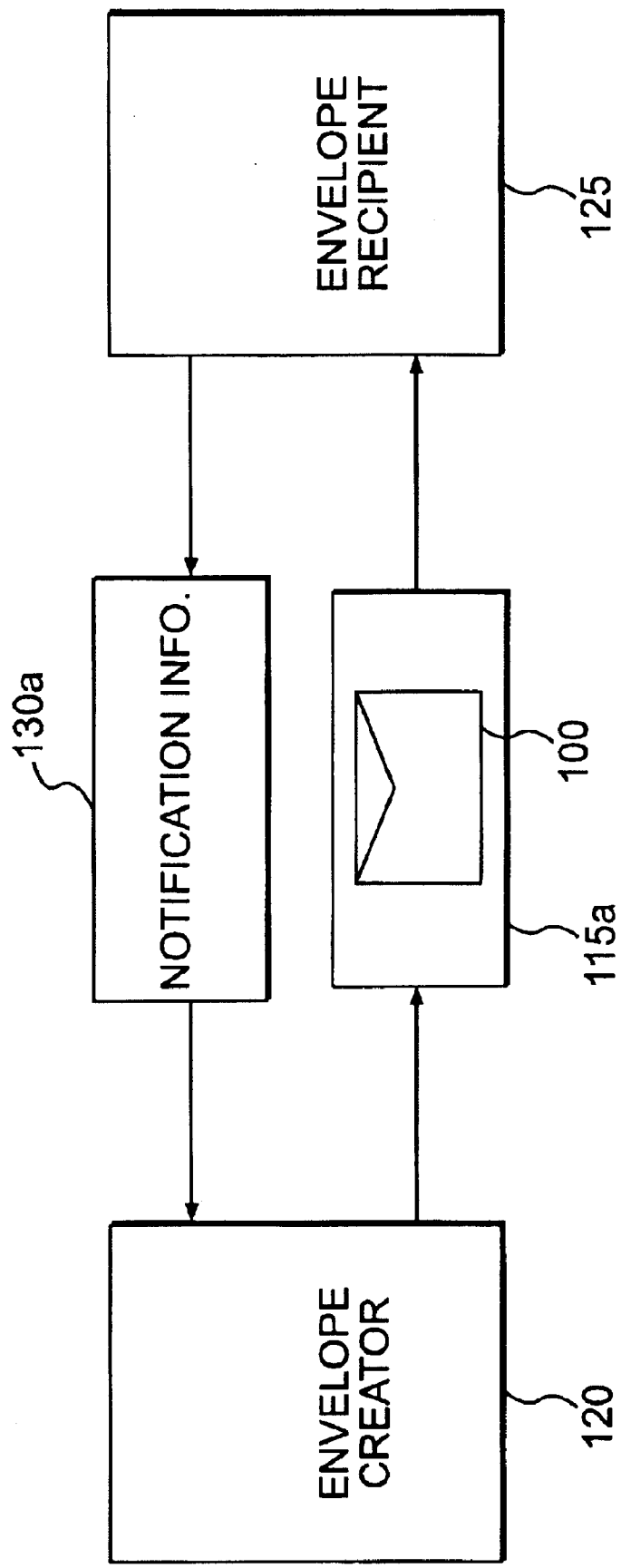
FIGS. 2A–2D are diagrams illustrating transmission of notification information.

Referring to FIG. 2A, an envelope 100 may be transmitted from an envelope creator 120 to an envelope recipient 125, for example, by including the envelope 100 as an attachment to an e-mail message 115a. Attempted access to the content of the envelope 100 by the recipient 125 causes execution of the notification instructions 110 of the envelope that collect and transmit notification information 130a from the recipient 125 to the envelope creator 120. Such information 130a may include system information (e.g., a network address and/or other data stored on a system) and/or demographic information such as a user's name, e-mail address, street address, and/or organization. The envelope creator 120 and recipient 125 may use the same or different computer systems.

Including an envelope 100 as an e-mail attachment 115a offers an envelope creator 120 a "certified receipt" functionality that transmits notification information 130a indicating that not only has a recipient received the envelope 100, but that the recipient has also accessed (or attempt to access) the envelope contents 105. The notification instructions 110 included in the envelope 100 can be configured during creation to report events other than attempted access to envelope contents 105 such as an attempt to save contents 105 to a file, an attempt to delete envelope contents 105, and/or an attempt to print envelope contents 105. For example, the notification instructions 110 may monitor viewing of electronic content 105 and transmit notification information 130a that summarizes the viewing (e.g., which pages of a document were read) when viewing ends.

An envelope 100 can be included as an e-mail attachment 115a using any e-mail software package that supports attachments (e.g., Lotus™ cc:Mail™, Microsoft™ Exchange, and Eudora). Because the envelope 100 includes its own independently executable notification instructions 110 that control electronic content 105 access and transmission of notification information 130a, 130b, the envelope 100 provides a notification mechanism independent of the capabilities of any particular e-mail software package. This independence offers a number of benefits. For example, because the functionality provided by an envelope 100 is independent of the e-mail package used to transmit or receive e-mail, users can continue to use an e-mail package of their choice without modification and still receive notification information 130 from an envelope 100. Additionally, because the envelope 100 need not rely on functions provided by any e-mail software package, defeating the notification scheme implemented by an envelope 100 becomes much more difficult than re-configuring an e-mail software package (e.g., an administrator clicking on a checkbox control that prevents transmission of return receipt messages).

Figure 2B:
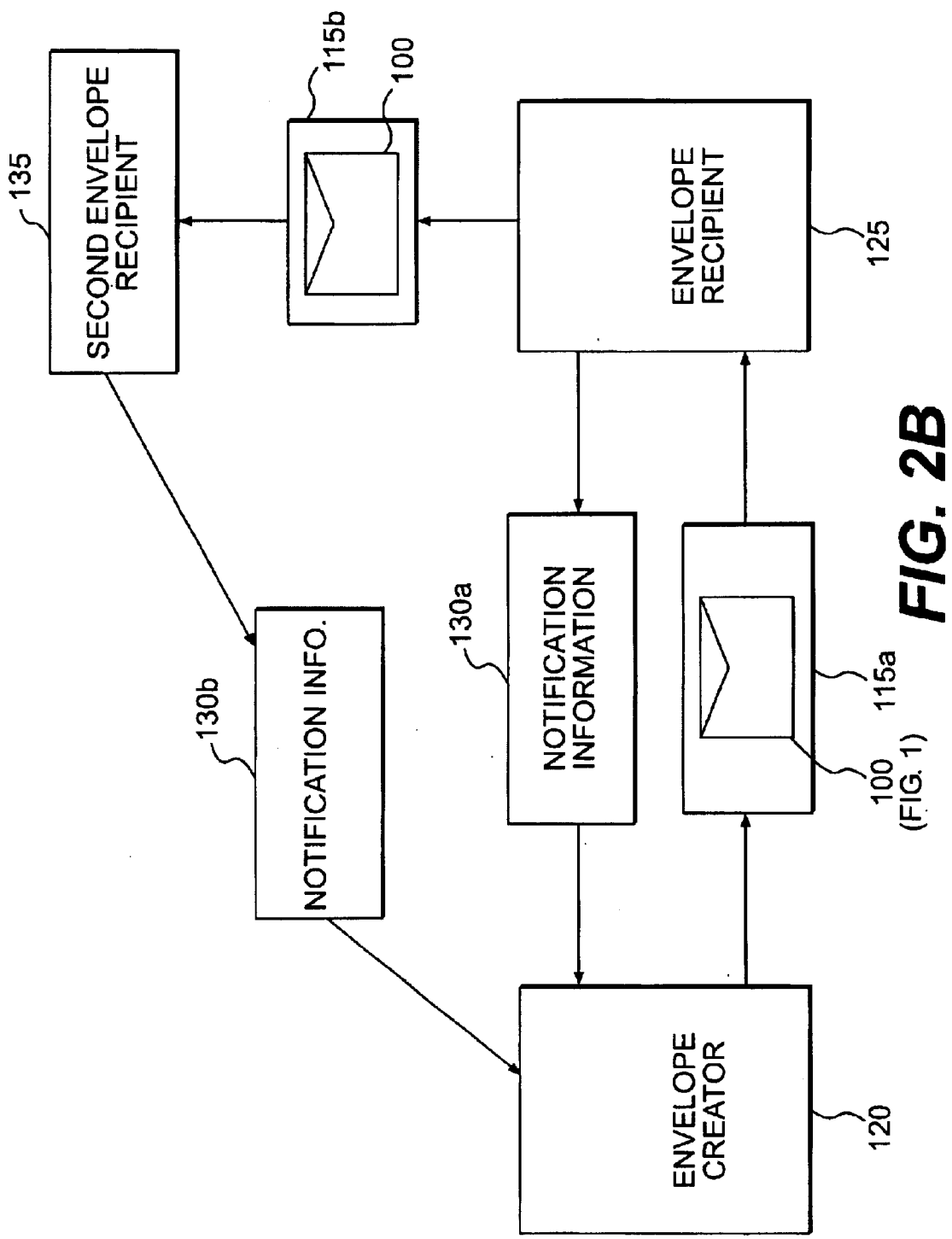

Referring to FIG. 2B, after transmission to a recipient 125, the envelope 100 remains a convenient way to transmit electronic content 105 included in the envelope 100 to others. Thus, a recipient 125 can easily re-transmit the received electronic content 105 to one or more new recipients 135 by forwarding the received envelope 100 in a new e-mail message 115b. The notification instructions 110, however, remain packaged with the electronic content 105 in the envelope 115 and continue to control access to the electronic content 105 and transmit notification information 130b collected from the different recipients 135 that receive the forwarded envelope 100. Thus, the notification instructions 110 collect and transmit notification information 130b to an envelope creator 120 each time a different user or computer accesses the electronic content 105 even though the recipient 135 did not receive the envelope directly from the envelope 100 creator. Thus, the notification information 130a, 130b received by an envelope creator 120 can produce a list of the different users and computers that access a particular envelope's electronic content 105 as an envelope 100 is passed on to different recipients. The information reported can provide invaluable marketing data that tracks the number and demographic attributes of users accessing a particular set of electronic content 105.

Figure 2C:
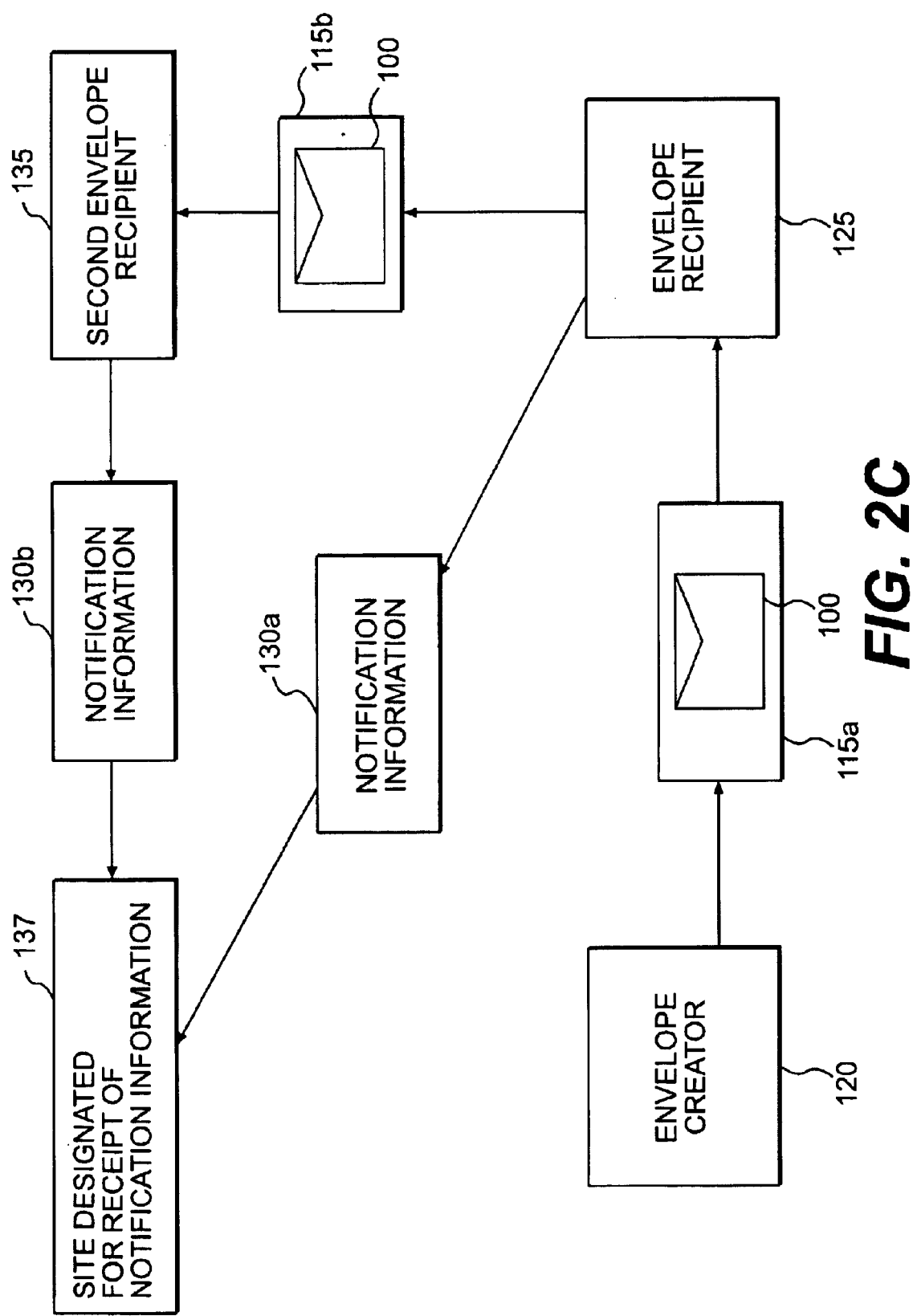

Referring to FIG. 2C, an envelope 100 creator may configure the envelope 100 to transmit collected notification information 130a, 130b, to an address 137 other than the address 120 of the envelope creator 120. Additionally, the envelope 100 creator can configure the envelope 100 to broadcast the notification information 130a, 130b to many different addresses (not shown).

Figure 2D:
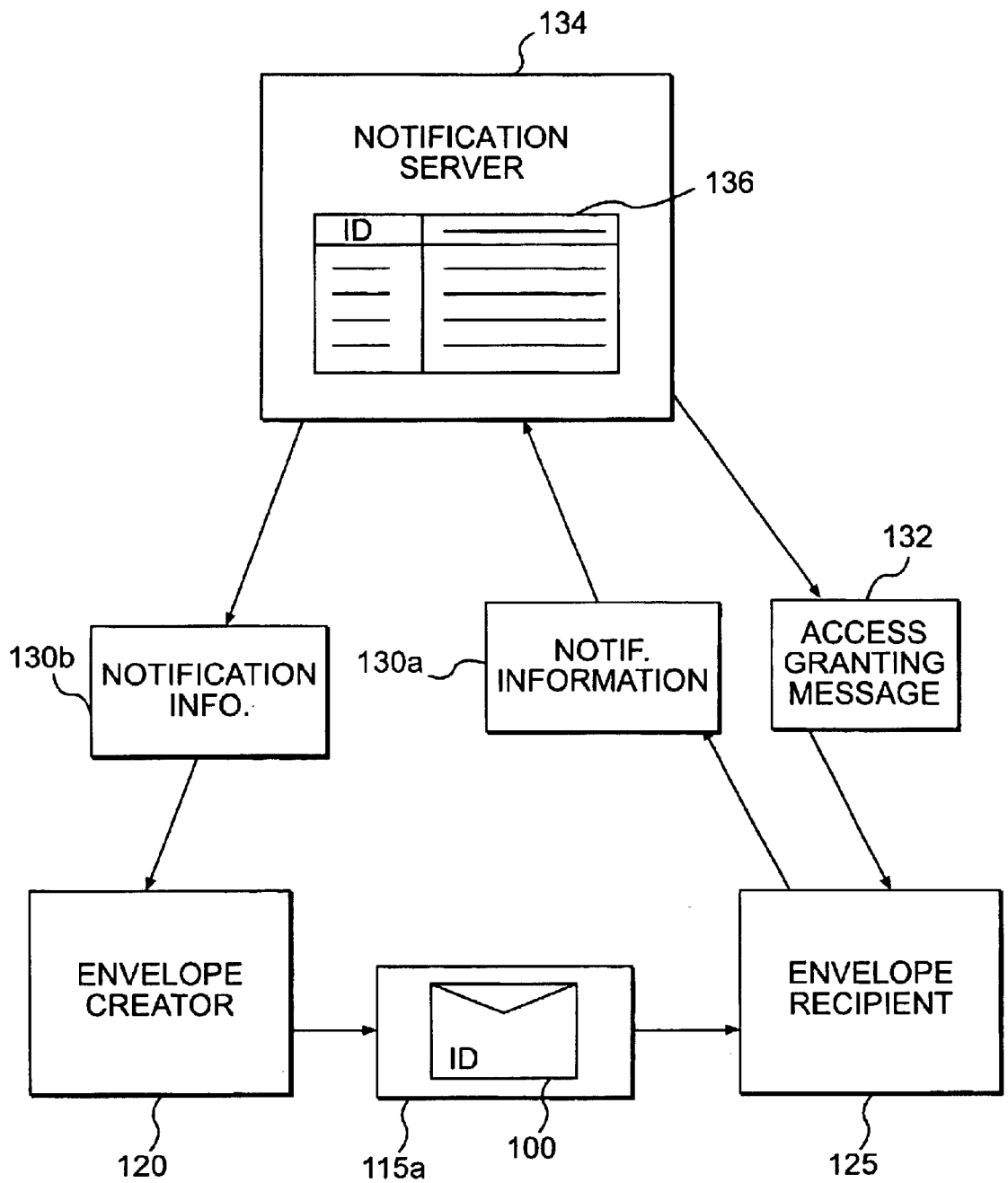

Referring to FIG. 2D, the notification instructions 110 included in an envelope 100 may transmit notification information 130a via a notification server 134 instead of directly to an address 120 designated during envelope creation. The notification instructions 110 may be configured to deny access until an access granting message 132 is received from the notification server 134. The notification server 134 may automatically transmit an access granting message 132 upon receipt of notification information 130a. Alternatively, the notification server 134 may process the notification information 130a before transmitting an access granting message 132. The use of a notification server 134 to transmit access granting messages 136 provides a method of controlling access (e.g., limiting the number of people who can access an envelope 100) without requiring server software to continually run on an envelope creator's computer.

The notification server 134 may include a table 136 that enables the server 134 to track use of envelopes and/or envelope production software. The table 136 can include information describing users of the envelope production software. For example, the table 136 can store identifiers corresponding to authorized envelope creators. The table 136 can also store information describing particular envelopes by storing envelope IDs as they are received.

To facilitate use of a notification server 134, each envelope 100 may include an identifier indicating the user or computer system 120 that created the envelope 100, the address of the notification server 134, and the address specified during envelope creation that ultimately receives the notification information. The notification server 134 can match the identifier included in the notification information 130a with an identifier in its table 136 to verify legitimate envelope production or compute usage charges. The notification server 134 can then re-transmit the notification information 130a to the address designated by an envelope creator during envelope creation.

Figure 3:
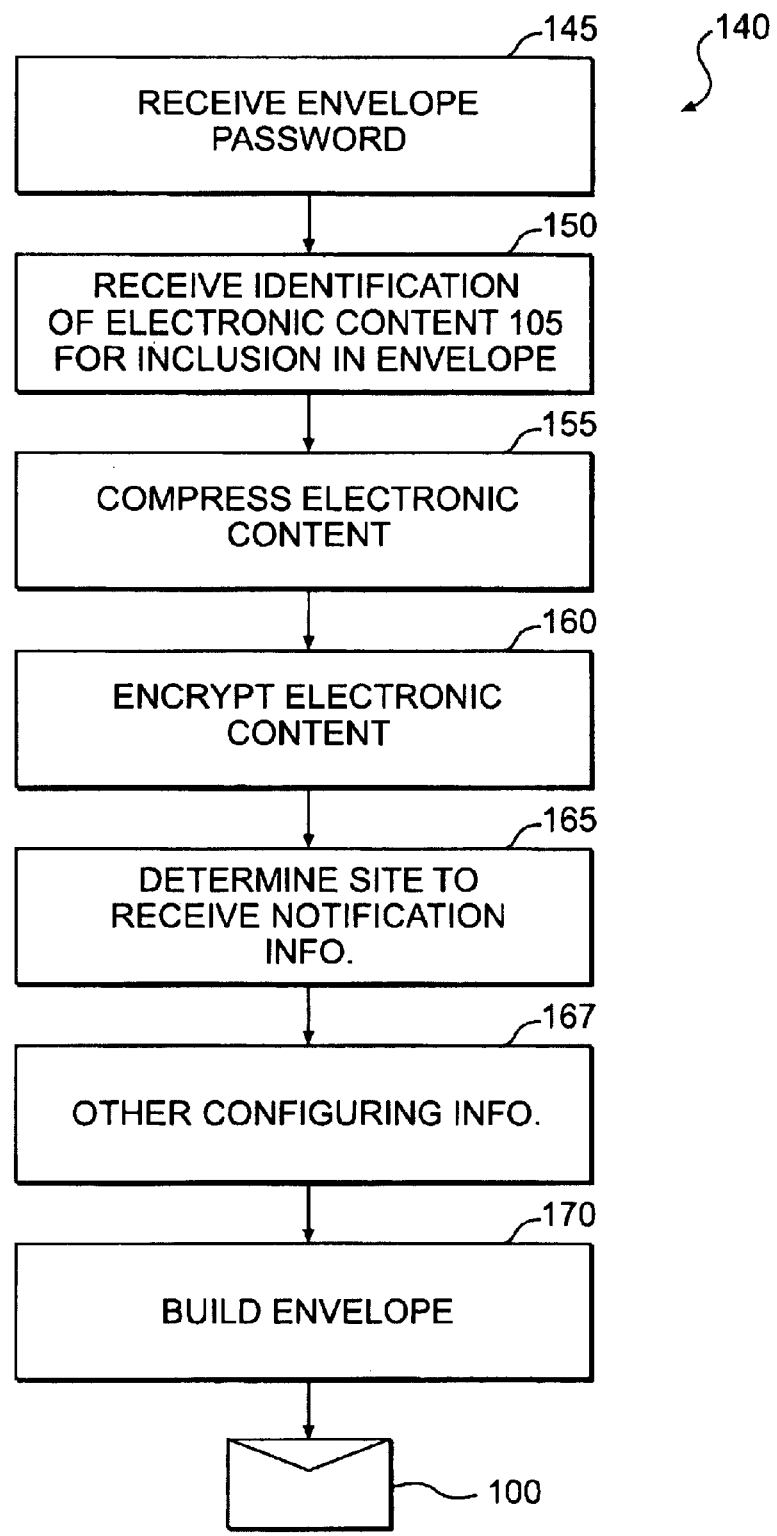
FIG. 3 is a flow chart of a procedure for creating envelopes.

Referring to FIG. 3, a procedure 140 produces an envelope 100. The procedure 140 may prompt (145) an envelope creator to designate a password for password protection of the electronic content 105. The notification instructions 110 use the designated password to deny access to an envelope's 100 electronic contents 105 to a recipient who fails to provide the designated password. Thus, unless a recipient receives an envelope's 100 password, for example, via a phone call or separately transmitted e-mail message, the recipient cannot access the electronic contents 105 of the envelope 100.

After receiving identification (150) of electronic content 105 for inclusion in an envelope 100, the procedure 140 may compress (155) the electronic content 105 to minimize the size (e.g., number of bytes) of the envelope 100 and, thus, speed transmission of the envelope 100 across network lines. The procedure 140 may use any one of a variety of compression algorithms such as PKZip compression. The procedure 140 also may encrypt (160) the electronic content 105 to provide security both during transmission over public network lines and to prevent attempts to bypass the notification instructions 110 and access an envelope's content 105 before successfully transmitting notification information 130a, 130b. The password designated by an envelope creator may act as the encryption key, providing extra protection against unauthorized access. The procedure 140 may use any of a variety of encryption algorithms such as Blowfish, DES (Data Encryption Standard), or PKZip encryption. The terms compression and encryption are not mutually exclusive. That is compressing data (i.e., making the size of an envelope smaller) may also serve to encrypt the data.

The procedure 140 may determine (165) a network address that will receive the notification information 130a, 130b. By default, the procedure 140 may assume that the user executing the envelope producing procedure 140 should receive the notification information 130a, 130b. For example, the procedure 140 may query a system configuration file (e.g., a Windows™ registry) to determine the e-mail address of the envelope creator. However, an envelope creator may expressly designate a different address at the time the envelope is created.

The procedure 140 may receive other envelope configuring (167) information from an envelope creator. For example, the creator may specify than the envelope 100 need not successfully transmit notification information 130a, 130b before granting access to the envelope's electronic content 105. The creator may even specify that no notification information 130a, 130b should ever be transmitted by the envelope 100.

The procedure 140 then builds (170) the envelope 100 to include data corresponding to the identified electronic content 105 and notification instructions 110. The notification instructions 110 included in the envelope 100 may vary depending on the envelope's 100 specified configuration. For example, an envelope 100 including compressed and encrypted data corresponding to the electronic content 105 may include notification instructions 110 that decompress and decrypt the data 105 when granting access to the content 105.

Other implementations of procedure 140 perform the actions shown in different orders. Further, some implementations omit actions shown. Additionally, other implementations may include different configuration capabilities. For example, an envelope 100 creator may configure the envelope 100 to collect different notification information 130a, 130b.

Figure 4:
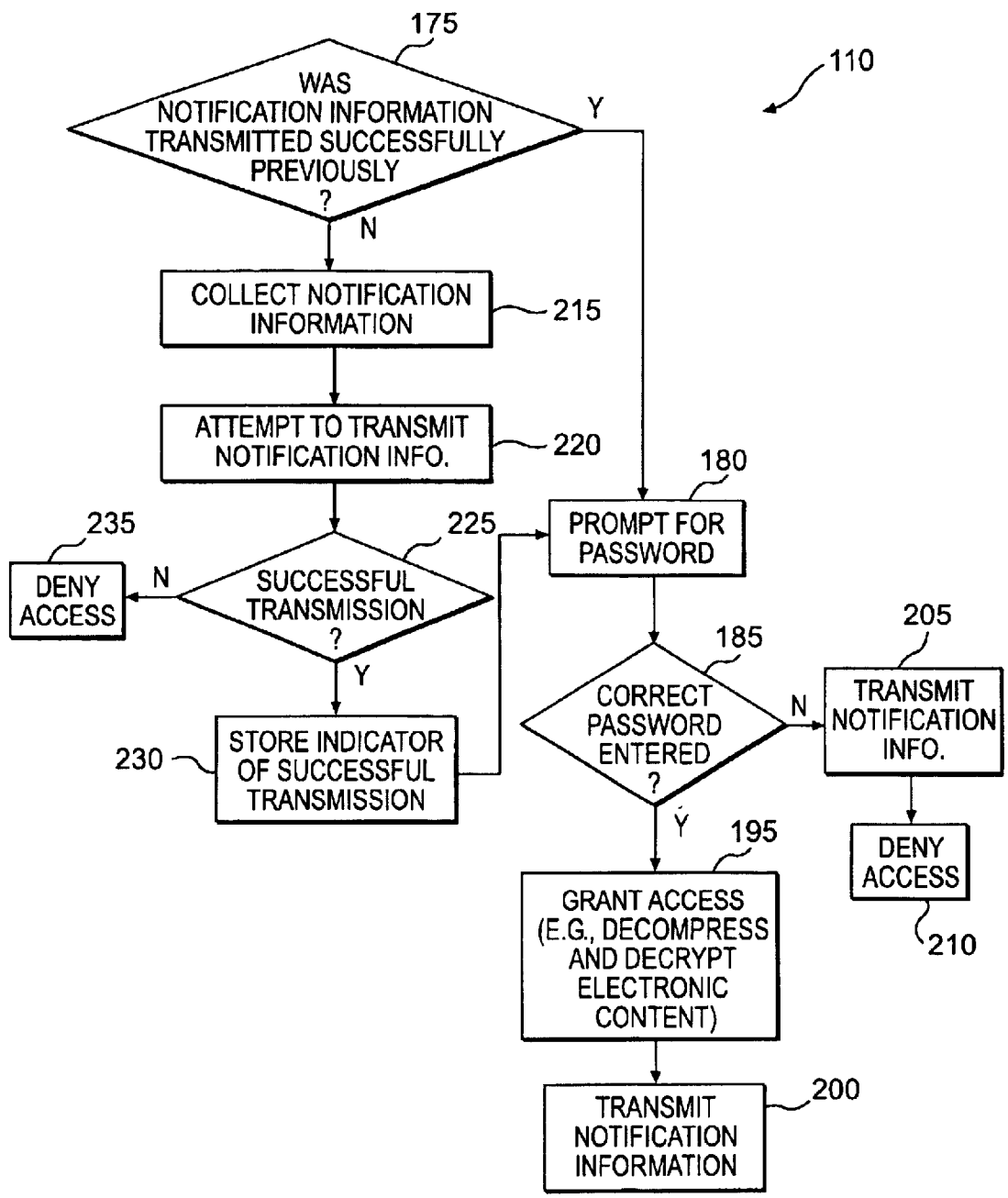
FIG. 4 is a flow chart of a procedure for controlling access to electronic content based on successful transmission of notification information.

Referring to FIG. 4, the notification instructions 110 included in an envelope 100 can be configured to control access to the electronic content 105. Typically, an envelope 100 will include compressed and/or encrypted electronic content 105. Further, different electronic content 105 included in an envelope may use different file formats (e.g., electronic content may include a JPEG file and a file that includes sound data). Thus, an envelope recipient usually cannot easily access the electronic content 105 by direct examination. Instead, the recipient must execute the notification instructions 110 of an envelope 115 to gain access (e.g., extract the electronic content 105 from the envelope). For example, a recipient may save an envelope 100 received as an attachment as a file and execute the file using platform specific commands (e.g., "C:\envelope.exe"). Many e-mail packages, such as cc:Mail™, can launch executable files from within the e-mail package.

When executed, notification instructions 110 can determine (175) whether a previous attempt to access the electronic content 105 resulted in success (e.g., success transmission of notification information 130a, 130b or receipt of an access granting message 136). If so, the notification instructions 110 may grant access (195) to the electronic content 105 without re-collecting and/or re-transmitting notification information 130a, 130b. If, however, a previous attempt to access the electronic content 105 did not result in success, the notification instructions 110 attempt to collect (215) and transmit (220) the notification information 130a, 130b.

Many different techniques exist for determining (175) whether a previous access attempt resulted in successful. For example, each envelope 100 may include an envelope ID. The envelope ID may be produced during envelope creation by combining a timestamp produced during envelope production with a machine identification code of the computer used to produce the envelope (e.g., a network address). The notification instructions can store (230) the envelope ID on a computer system (e.g., in the registry) after successful transmission of notification information 140. By examining a computer system for prior storage of an envelope's envelope ID, the instructions 110 can determine (175) whether a previous access attempt succeeded. The determination (175) may be a computer system-based or a user-based inquiry. For example, by storing a user identification code along with the envelope ID, the notification instructions 110 can distinguish between different users of the same computer system. Thus, the notification instructions 110 do not repeatedly require re-transmission of notification information 130a, 130b by users who already have successfully transmitted notification information 140.

If the instructions 110 determine (175) that no previous access attempt succeeded, the instructions 110 collect (215) notification information 130a, 130b. The notification instructions 130 may interactively collect notification information 140 from a recipient through a GUI dialog (see FIG. 6H). The notification instructions 130 also may collect information by querying the recipient's computer system. For example, the notification instructions 130 may examine registry information to retrieve a wide variety of system and demographic information.

After collecting (215) the notification information 130a, 130b, the notification instructions 110 attempt (220) to transmit the collected notification information 130a, 130b to the address specified during an envelope's creation (165 FIG. 3). An attempt to transmit the notification information 130a, 130b may fail immediately and return a network service error code (e.g., a port timeout error code). Additionally, even though transmission does not result in a network service error, the computer sending the notification information 130a, 130b may not receive a network acknowledgment message that indicates successful transmission and receipt of the notification information 130a, 130b. Further, notification instructions 110 configured to grant access only upon receipt of an access granting message may fail to receive the access granting message 132 after a period of time. The notification instructions 110 may be configured during envelope creation to deny access based on any of these circumstances, alone or in combination. If, however, the attempted transmission succeeds (225) or an access granting message 136 is received, the notification instructions 110 can store (230) data indicating successful access.

The notification instructions 130 may prompt (180) a recipient for entry of the password, if any, designated during envelope 100 creation (145 FIG. 3). Entry of a correct password (185) can cause the notification instructions 11 to grant (195) access to an envelope's electronic content 105. Granting access may include decompressing and decrypting the electronic content 105. As previously discussed, events other than attempted access may trigger collection and transmission: of notification information 130a, 130b. For example, as shown notification information 130a, 130b may be transmitted after entry of an incorrect password (205) or after each successful access to electronic content 105 (200).

Different implementations of the instructions 110 may not perform the same actions or perform actions in the same order as shown. For example, prompting for a password (180) may occur prior to a determination (175) of whether notification information 130a, 130b was successfully transmitted.

Figure 5:
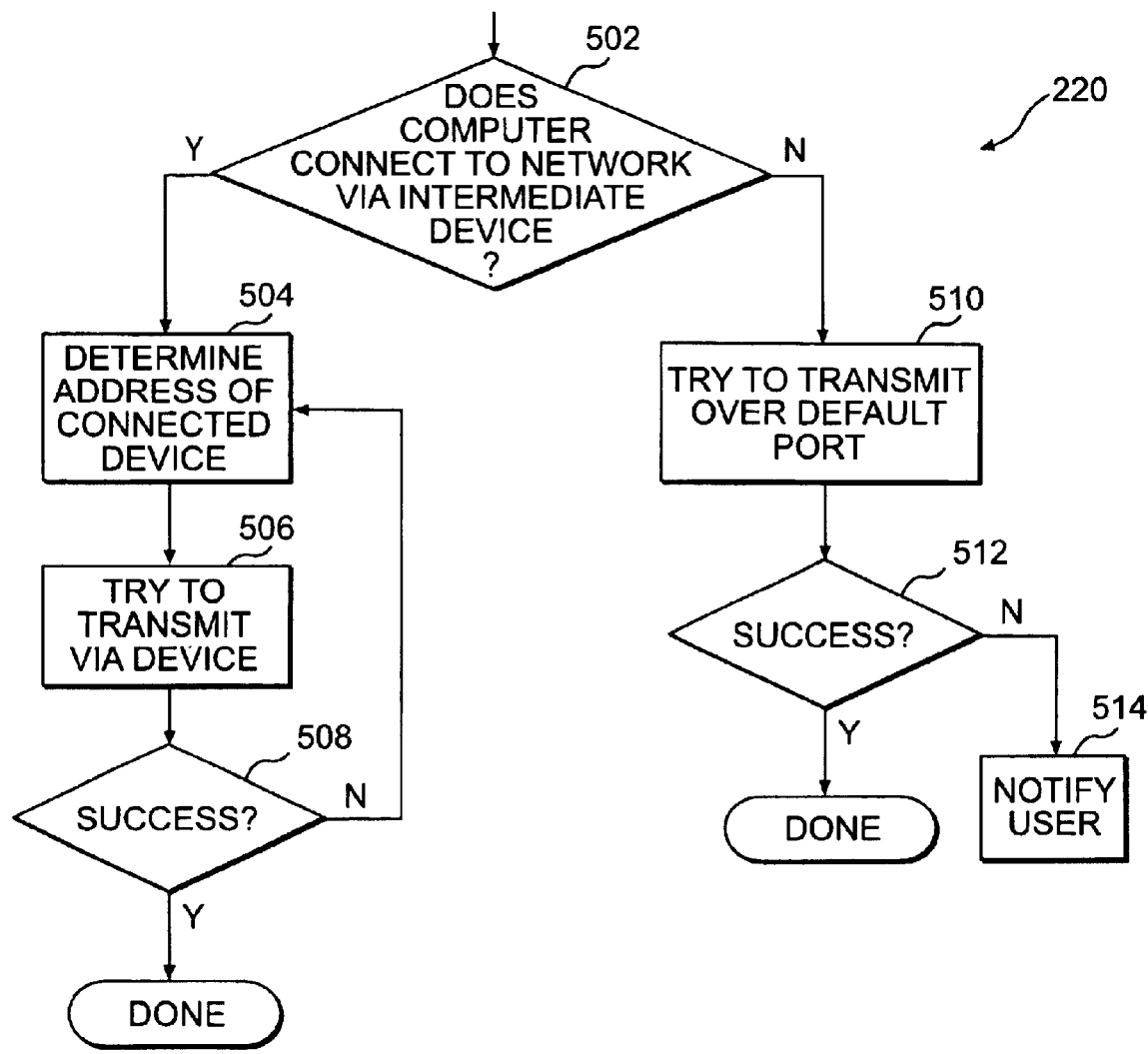
FIG. 5 is a flow chart of a procedure for transmitting notification information.

Referring to FIG. 5, an envelope's notification instructions 110 have no prior knowledge of the place a recipient's computer holds in a network configuration. For example, some computers connect directly to a public network (e.g., the Internet) while others connect via intermediate devices such as protective proxy servers or firewalls. Thus, the notification instructions 110 include instructions 220 that dynamically determine how to navigate through a network configuration to a public network. The ability to adapt to different configurations makes it more difficult for an administrator or recipient to prevent transmission of notification information 130a, 130b.

The instructions 220 transmit notification information 130a, 130b by determining how a recipient's computer connects to a network (502). For example, the instructions 220 can check a computer system's registry to see if proxy service is enabled or disabled. If disabled, the instructions 220 can try to transmit notification information via communication ports customarily used for network use (e.g., port 1080 which is typically reserved for Internet communication) (510). If such efforts fail, the instructions may try other commonly used ports or notify the user that transmission was unsuccessful (504).

If proxy service is enabled, notification information 130a, 130b must be sent to the network via an intermediate device. Thus, the instructions 220 attempt to determine the address of the intermediate device (504). For example, the instructions 220 may examine the registry to determine how different network services access the Internet from the computer system. For example, instructions 220 may examine the address stored in a Hkey_Classes_Root/Internet/ Netscape/ProxyServer registry entry to see how a Netscape™ browser accesses the Internet through the intermediate device. After determining the address of the intermediate device, the instructions 220 attempt to transmit the notification information 110 (506) via the determined address. If the transmission fails (508), the instructions 220 may make another attempt using a different registry entry corresponding to a different network service (e.g., Microsoft™ Explorer). Alternatively, the instructions 220 may query the user for the address of the intermediate device.

Referring to FIGS. 6A–6J, an intuitive graphical user interface facilitates production of an envelope 100 from electronic content 105. The interface uses a vault metaphor that presents each envelope 100 as storing electronic contents 105 behind access doors 290a, 290b.

Figure 6A:
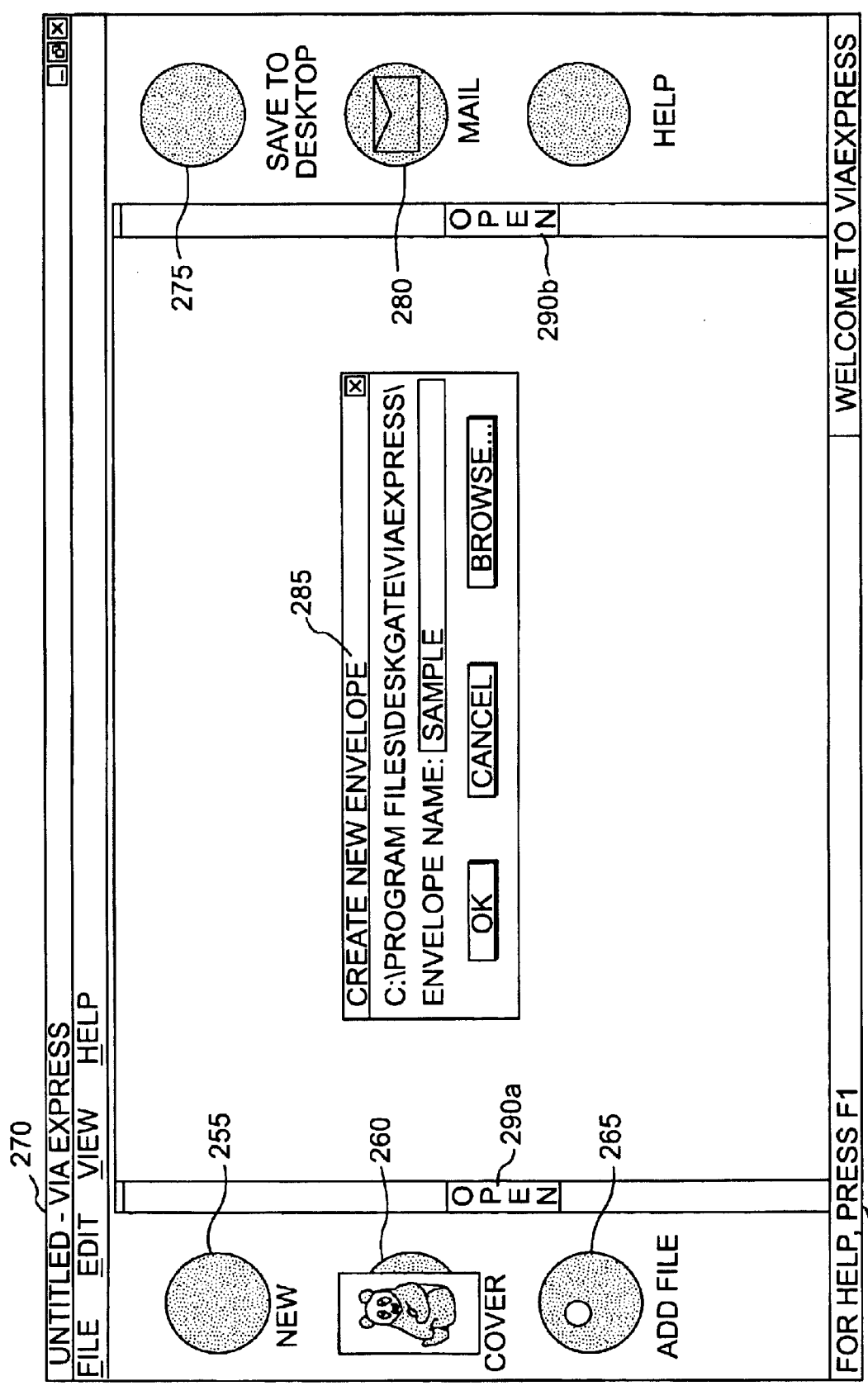

Referring to FIG. 6A, in addition to a menu bar 270, the interface screen 250 includes buttons (e.g., 255) that initiate tasks needed to create an envelope 100. As shown, the interface screen 250 includes a "New" button 255. Selecting the "New" button (e.g., moving a mouse and clicking on the button) initiates creation of a new envelope 100. As shown, a dialog 285 enables an envelope creator to name the new envelope 100 (e.g., "Sample"). A directory of the same name (e.g., "Sample") is created on the user's computer to store files added to the envelope.

Figure 6B:
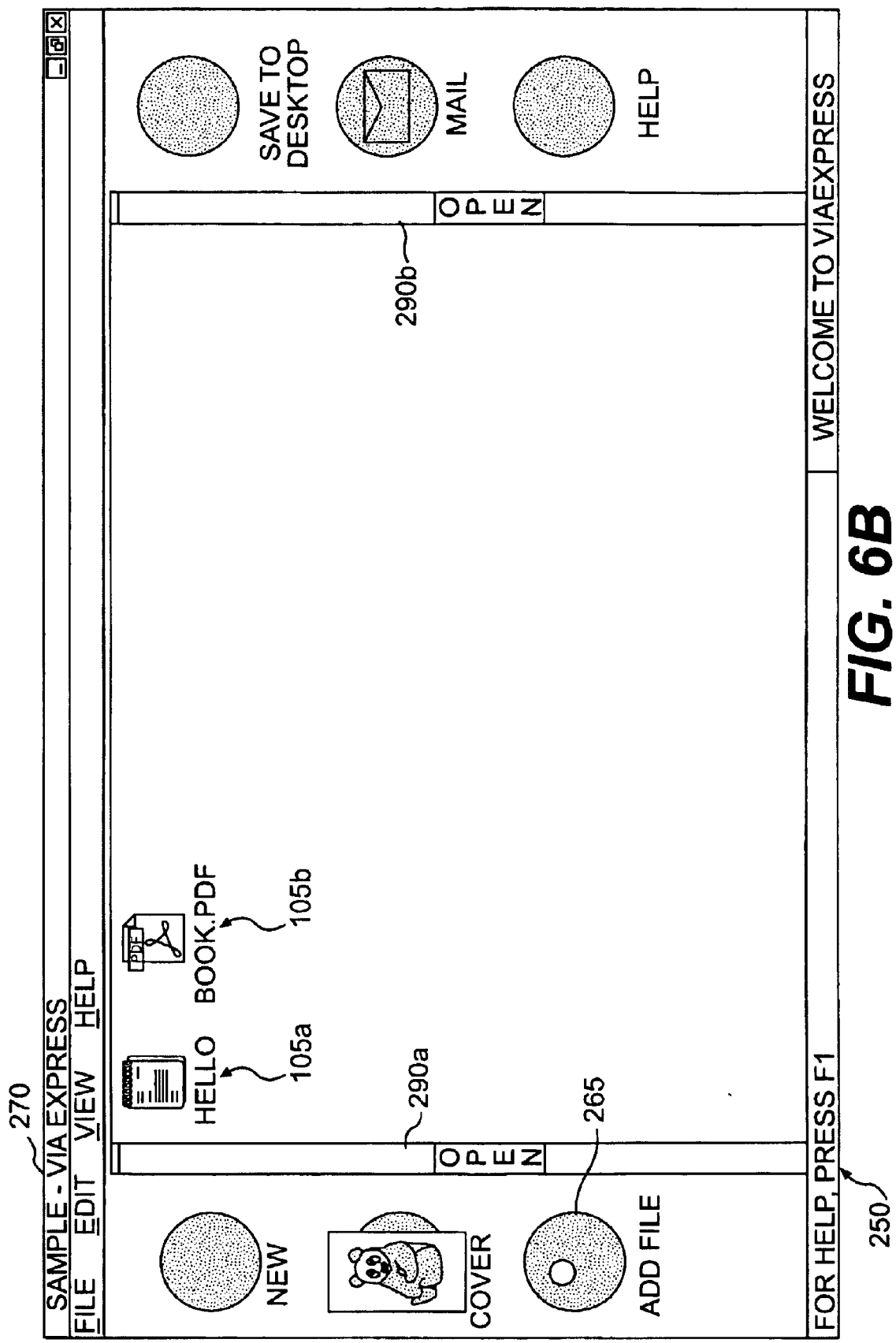

Referring to FIG. 6B, an envelope creator has added electronic content 105 including a text file 105a and an Adobe™ PDF file 105b. The user can add electronic content 105a, 105b by selecting an "Add File" button 265 and browsing through system directories and selecting files, by interacting with items in the menu bar 270, or by dragging-and-dropping files into the interface screen 250.

Figure 6C:
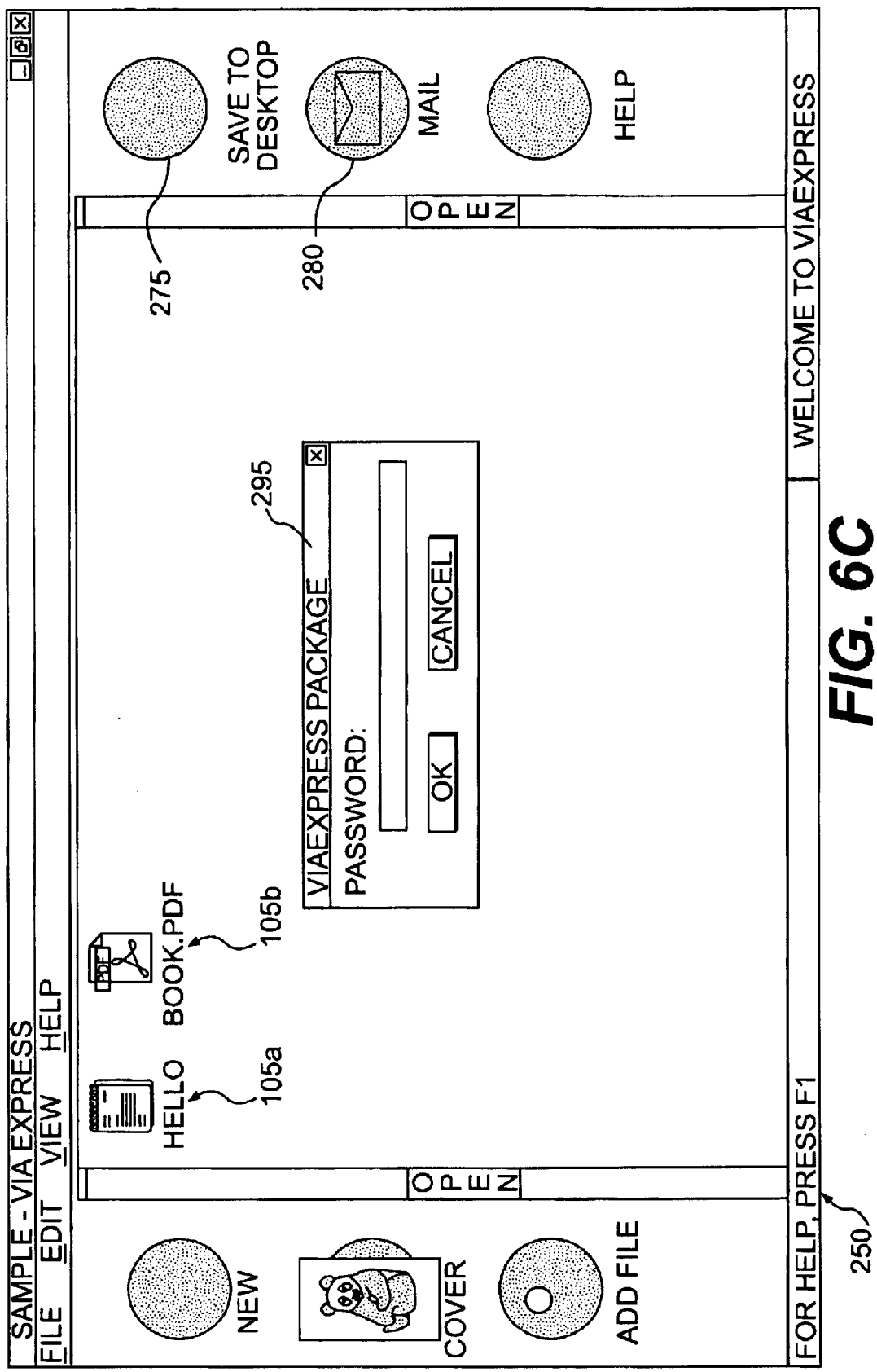
Figure 6D:
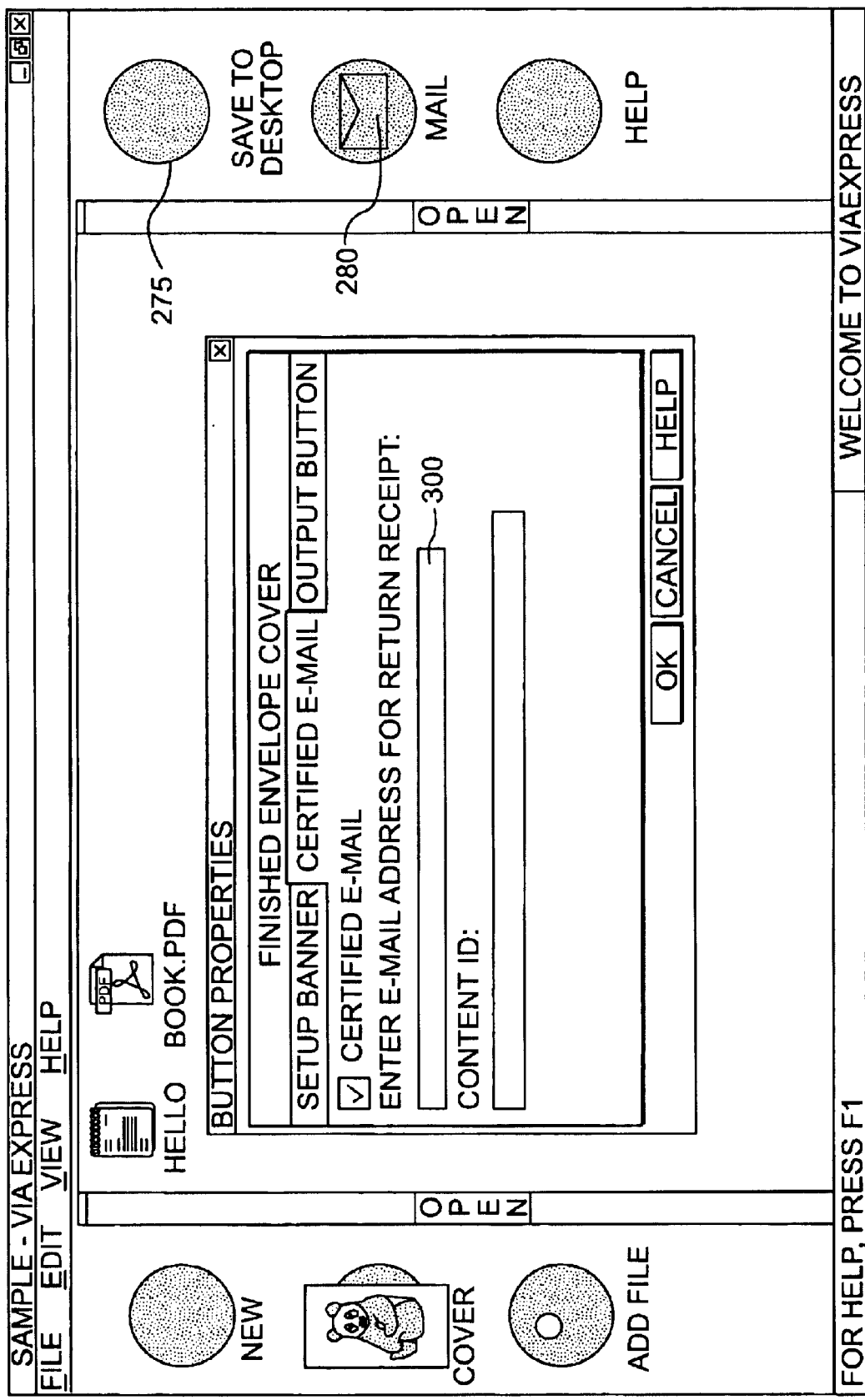

Referring to FIG. 6C, after adding electronic content 105a, 105b, the user selects either a "Save to Desktop" button 275 or a "Mail" button 280 to generate an instance of an envelope 100. As shown, a dialog 295 may prompt the user to designate an envelope password to protect the electronic contents 105a, 105b. As shown in FIG. 6D, a dialog also may request specification of an address 300 for receipt of the notification information 130a, 130b.

Figure 6E:
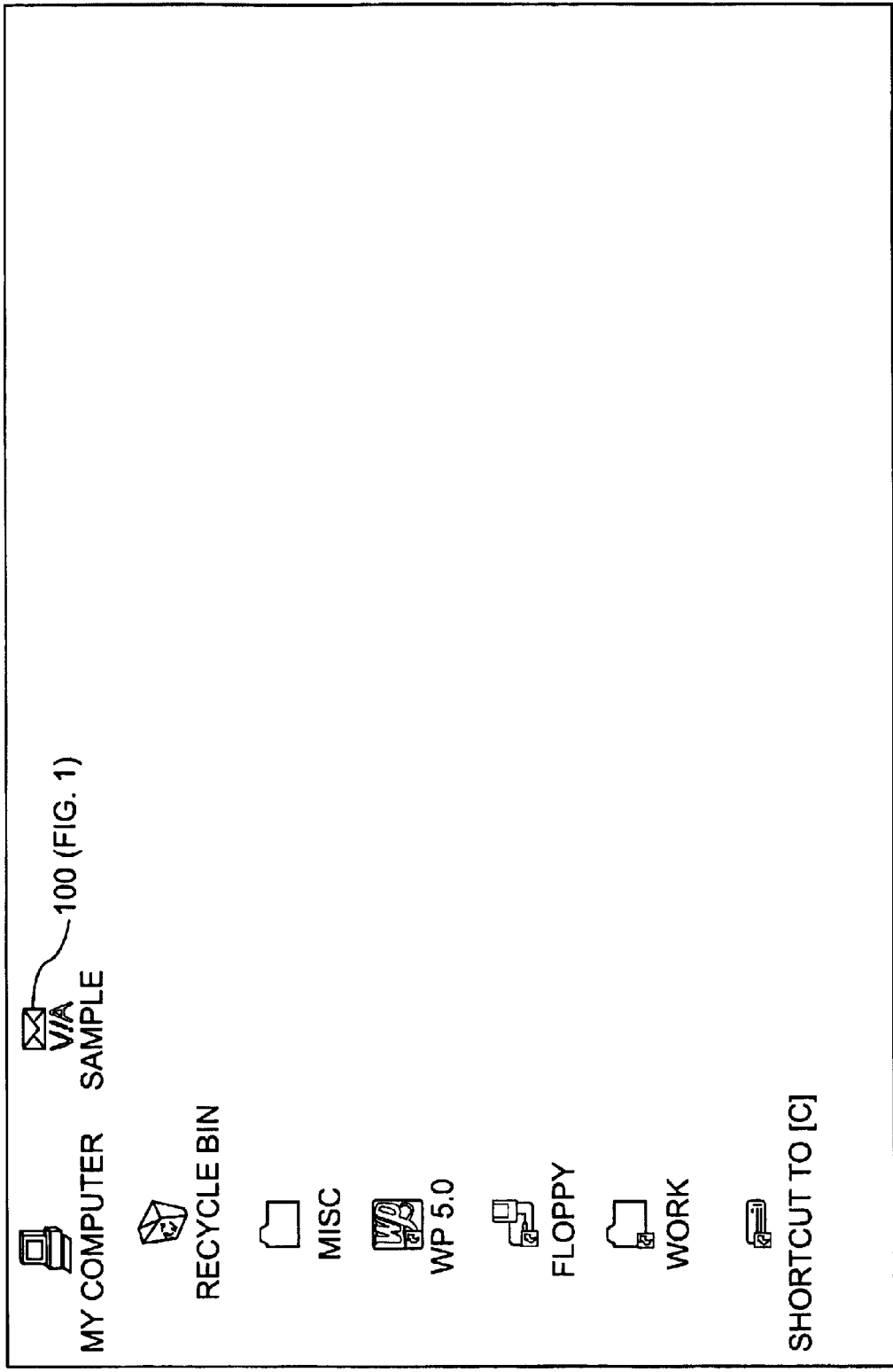
Figure 6F:
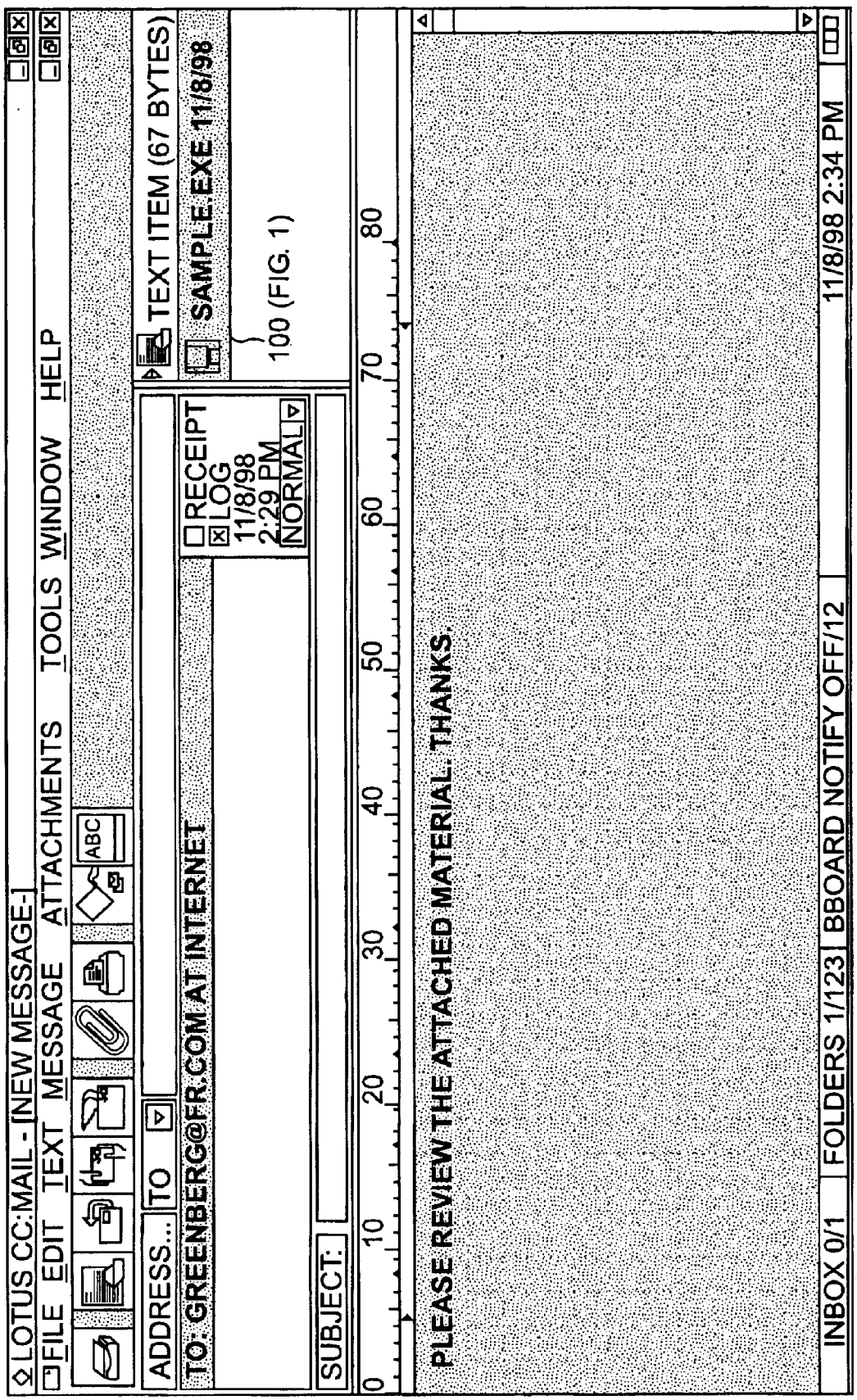

Selecting the "Mail" button 280 launches a linked e-mail client (e.g., cc:Mail™) and causes it to create a new message having the envelope 100 as an attachment. Then, the user can optionally enter text and/or add other attachments before sending the e-mail message and attachments according to the particular protocol of the e-mail client. Alternatively, as shown in FIG. 6E, selecting the "Save to Desktop" button saves the envelope 100 to a system desktop 305 or directory. A user can then e-mail the envelope 100 as an attachment by manually including the envelope 100 in an e-mail message. As shown in FIG. 6F, a user has attached an envelope to a Lotus™ cc:Mail™ e-mail message.

Figure 6G:
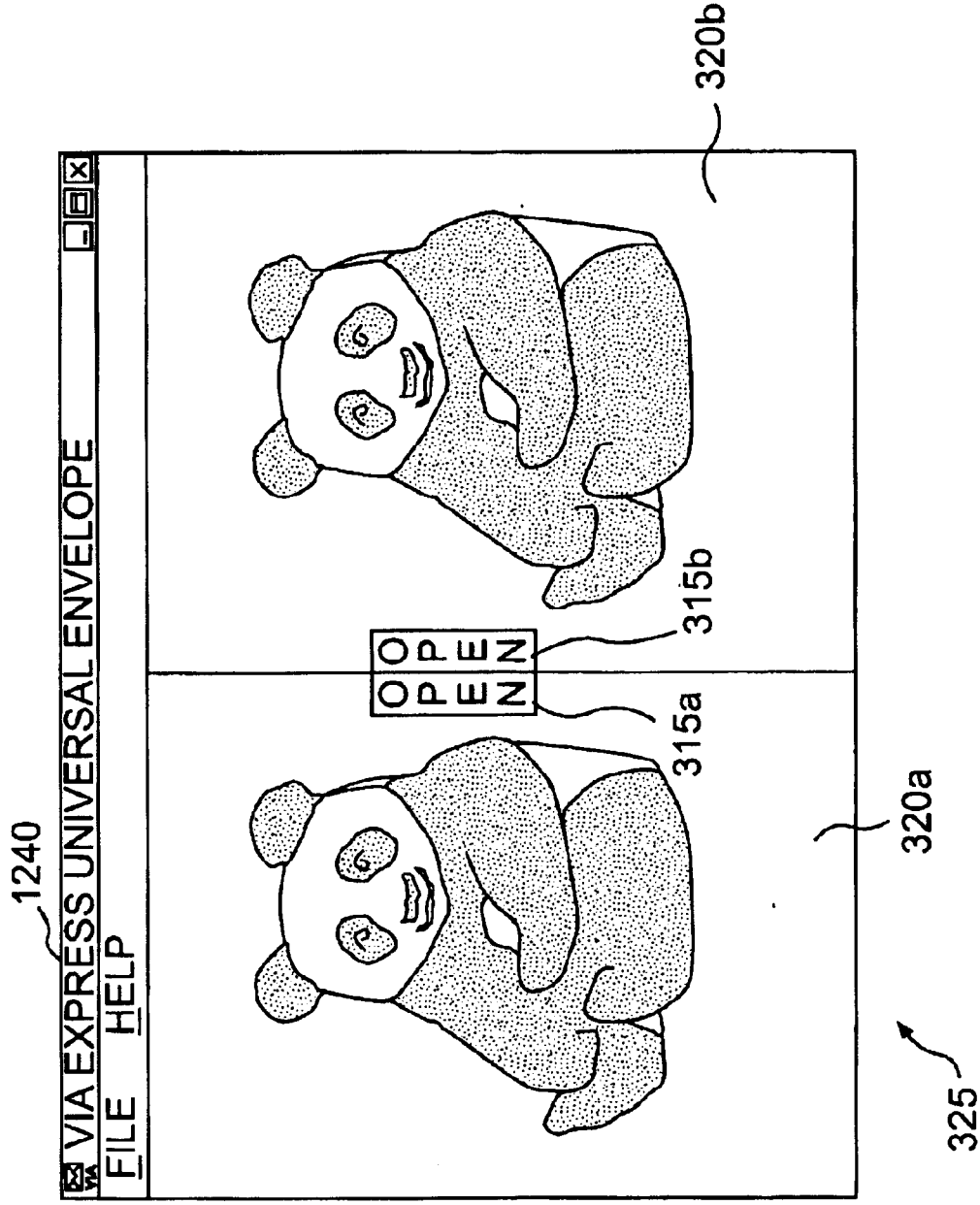

As shown in FIG. 6G, after transmission to a recipient, a recipient can attempt to access electronic content 105 in an envelope 115 by interacting with a graphical user interface provided by the notification instructions. Continuing the vault motif, the screen shows a pair of access doors 320a, 320b each having "open" buttons 315a, 315b. The doors 320a, 320b may also include a graphic image (e.g., a panda) or series of images specified by the creator of the envelope 100. Selecting either "open" button 280a, 280b can signify attempted access to the electronic content 105 and thus cause collection and attempted transmission of the notification information 130a, 130b by the notification instructions 110.

As shown in FIG. 6H, notification instructions 110 optionally may collect demographic information via a dialog 330 that includes text controls for entry of a person's name 335, e-mail address 340, and organization 345. As previously described, collection of information may be performed instead of, or in addition to system calls or examination of configuration files.

Referring to FIG. 6I, the envelope creator or other address designated during envelope creation receives an e-mail message containing the notification information.

Figure 6J:
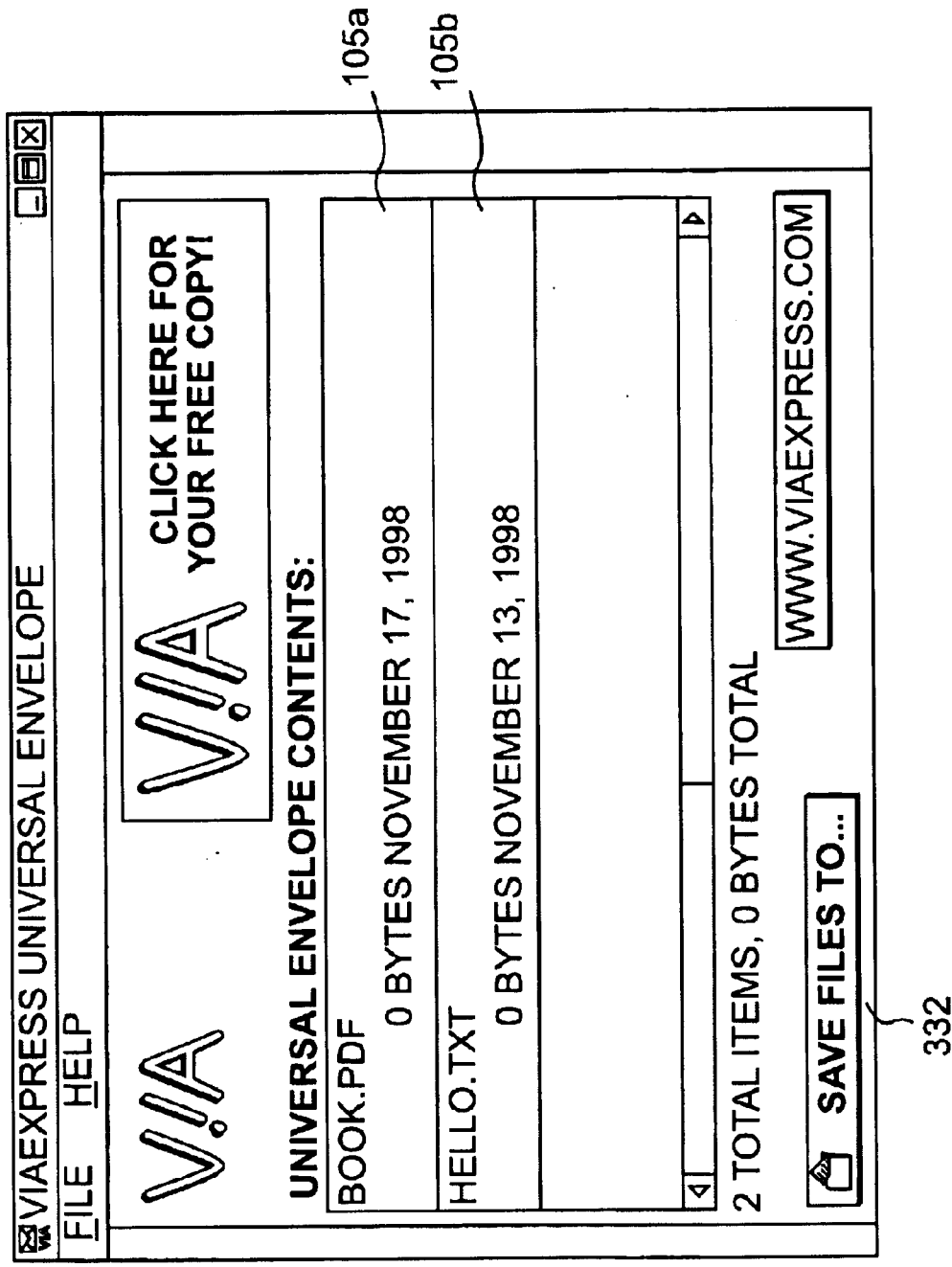

Referring to FIG. 6J, after successful transmission of the collected notification information, the graphical user interface presents the envelope recipient with a list of the electronic content 105a, 105b included in the envelope 100 during envelope creation. The recipient can view the content, for example, by selecting (e.g., clicking on) an electronic content icon 105a, 105b or can save (e.g., by selecting button 332) the electronic content 105a, 105b to specified files.

Figure 7:
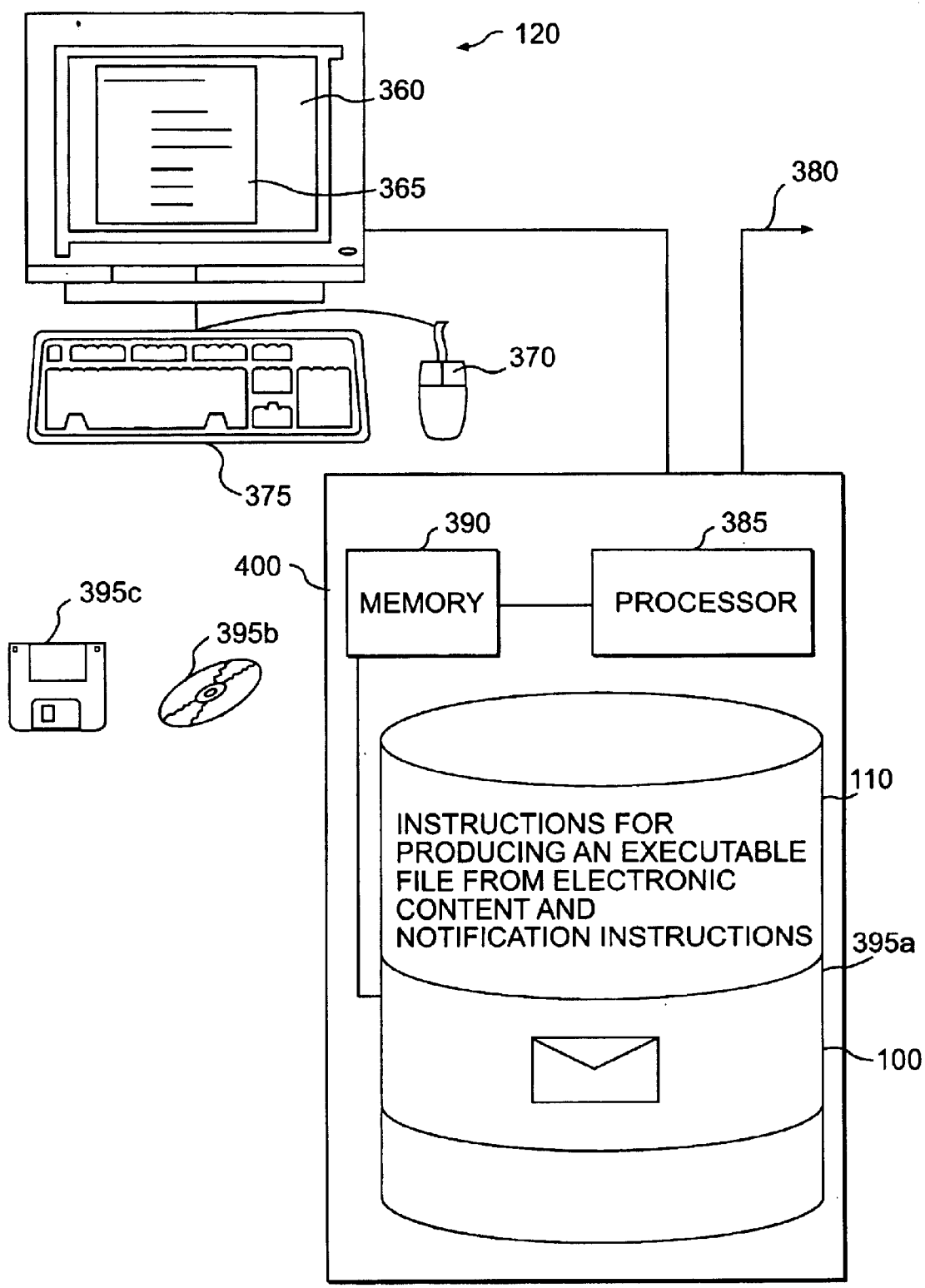
FIG. 7 is a diagram of a computer platform.

Referring to FIG. 7, a computer platform 120 suitable for executing instructions 140 that produce an envelope 100 includes a digital computer 400 having memory 390 and a processor 385. The digital computer 400 also includes a mass storage device 395a (e.g., a hard disk) that includes the instructions 140 for creating an envelope from electronic content. In the course of operation, instructions 140 are transferred from the mass storage device 395a to memory 390 and processor 385 for execution. Of course, a wide variety of mass storage devices such as a floppy disk 395b or a CD-ROM 395c may store the instructions 110.

The computer platform 120 also may include a monitor 360 for displaying the graphical user interface screens 365 and electronic content 105. The user may interact with the graphical user interface 365 via a keyboard 375 and/or a pointing device such as a mouse 370. The computer platform 120 also includes a network connection 380 that permits transmission of the executable file to other computers.

Other embodiments are within the scope of the following claims. For example, rather than implementing the instructions that construct an envelope as a stand-alone application, different implementations may integrate the instructions directly into an e-mail software package. Such a e-mail software package expands traditional e-mail packages capabilities beyond receiving a "return receipt" message. For example, these packages can provide mechanisms that regulate access to e-mail content and track access to the e-mail content via notification information received from recipients accessing the content.

In one embodiment, an e-mail system could provide a "certified receipt" feature as a native function. Upon generating an email message, a user-could designate (e.g., by using pull-down menu functions or by clicking appropriate check-boxes) that the text of the email message itself, and/or the content of one or more attachments to the email, require "certified receipt" before the recipient could view or otherwise access the content. The message sender optionally could designate the nature and type of notification information to be collected from the recipient, as well as the identity or address of one or more parties that are to receive the notification information.

What is claimed is:

1. A method of tracking electronic content, the method comprising the steps of:

producing a file that includes electronic content, and executable instructions that collect notification information and attempt to transmit notification information to an address when triggered by an event, the executable instructions denying access to the electronic content until the notification information is transmitted; and transmitting notification information when the electronic content is accessed by a successive recipient to the address, wherein the address is an address other than that of an immediate sender of the electronic content.

2. The method of claim 1, wherein the executable instructions further deny access until an access granting message is received in response to the successful transmission of notification information.

3. The method of claim 1, wherein the trigger event comprises an attempt to access the electronic content.

4. The method of claim 3, wherein an attempt to access the electronic content comprises an attempt to view, use, or list the electronic content.

5. The method of claim 3, wherein the trigger event comprises an attempt to access the electronic content on a computer that has not previously been used to access the electronic content.

6. The method of claim 3, wherein the trigger event comprises an attempt to access the electronic content by a user who has not previously accessed the electronic content.

7. The method of claim 1, wherein the executable instructions that collect notification information comprise instructions for querying a computer for notification information.

8. The method of claim 1, wherein the executable instructions that collect notification information comprise instructions for interactively collecting information from a user.

9. The method of claim 1, wherein the notification information comprises demographic information.

10. The method of claim 9, wherein demographic information comprises at least one of the following: a name, an e-mail address, and an organization identifier.

11. The method of claim 1, wherein the notification information comprises system information.

12. The method of claim 11, wherein system information comprises a network address.

13. The method of claim 1, wherein the electronic content comprises compressed electronic content.

14. The method of claim 13, wherein the executable instructions comprise instructions that cause the electronic content to be decompressed after successfully transmitting the notification information.

15. The method of claim 1, wherein the electronic content comprises encrypted electronic content.

16. The method of claim 15, wherein the executable instructions comprise instructions that cause the received electronic content to be decrypted after successfully transmitting the notification information.

17. The method of claim 1, wherein the electronic content comprises information included in at least one file of data, text, graphics, audio, video, or an executable program.

18. The method of claim 1, further comprising, transmitting the file via e-mail.

19. The method of claim 18, wherein transmitting the file via e-mail comprises transmitting the file as an e-mail attachment.

20. The method of claim 1, further comprising, determining the address.

21. The method of claim 20, wherein determining the address comprises interactively receiving an address from a user.

22. The method of claim 20, wherein determining the address comprises automatically identifying the address as the address of the user creating the file.

23. The method of claim 1, wherein the instructions that transmit notification information comprise instructions that dynamically determine how to transmit the notification information via an intermediate device.

24. The method of claim 23, wherein an intermediate device comprises at least one of the following: a proxy server and a firewall.

25. A method of tracking access to electronic content, the method comprising the steps of:

encrypting electronic content;

determining an address for receipt of notification information; and producing a file that includes the encrypted electronic content, and executable instructions that collect notification information, and attempt to transmit the notification information to the determined address in response to an attempt to access the electronic content on a computer that has not previously accessed the electronic content, the notification instructions decrypting the encrypted electronic content after transmitting notification information successfully, and transmitting notification information when the electronic content is accessed by a successive recipient to an address other than that of an immediate sender of the electronic content.

26. The method of claim 25, wherein decrypting the encrypted electronic content after transmitting notification information successfully comprises decrypting the electronic content after receiving an access granting message.

27. A method for tracking access to electronic content, the method comprising:

receiving notification information from a recipient of a file including electronic content, the notification information being collected by executable instructions and being transmitted in response to an attempt to access the electronic content, the notification information including an identifier that identifies a user or computer system transmitting the notification information when the electronic content is accessed by a successive recipient to an address other than that of the immediate sender of the electronic content;

determining an address for receipt of the notification information; and transmitting the notification information to the determined address, the executable instructions denying access to the electronic content until the notification information is transmitted.

28. The method of claim 27, further comprising transmitting access granting messages.

29. The method of claim 27, further comprising verifying that the identifier that identifies a user or computer system included in the notification information corresponds to an authorized user of the software for producing the file.

30. The method of claim 27, further comprising
updating information corresponding to the identifier that identifies a user or computer system included in the notification information.

31. The method of claim 30, wherein updating comprises computing a usage charge.

32. A computer-implemented method of regulating access to electronic content, the method comprising:
collecting notification information from a recipient and successive recipients of the electronic content in response to an attempt to access the electronic content;
attempting to transmit the collected notification information to an address other than that of the immediate sender of the electronic content when triggered by an event; and
selectively granting access to the electronic content based on a result of the attempted transmission of the notification information,
wherein executable instructions collect the notification information and selectively deny access to the electronic content until the notification information is transmitted.

33. The method of claim 32 in which access to the electronic content is granted if the attempted transmission is successful and access to the electronic content is denied if the attempted transmission is unsuccessful.

34. The method of claim 32 in which access to the electronic is granted if the attempted transmission results in receipt of an access granting message and access to the electronic content is denied if the attempted transmission does not result in receipt of an access granting message.

35. The method of claim 32 in which access to the electronic content is denied if no notification information is collected.

36. The method of claim 32 in which the electronic content is included in an attachment to an e-mail message.

37. The method of claim 36, in which the attempt to transmit the collected notification information comprises sending the notification information to an address associated with an originator of the e-mail message.

38. The method of claim 36 in which the attempt to transmit the collected notification information comprises sending the notification information to an address other than an address associated with an originator of the e-mail message.

39. The method of claim 38 in which the other address is designated by the originator of the e-mail message.

40. The method of claim 32 further comprising, prior to the collection of notification information, detecting that a user of a computer system is attempting to access electronic content embedded in an e-mail attachment.

41. The method of claim 32 further comprising providing subsequent access to the electronic content, without re-collecting or re-transmitting notification information, if the notification information already has been collected and transmitted successfully.

42. The method of claim 32 further comprising deactivating the collection and transmission of notification information after the notification information has been collected and transmitted successfully.

43. The method of claim 42 further comprising re-activating the collection and transmission of notification information if the electronic content is forwarded to another computer or another user.

44. The method of claim 32 in which the attempt to transmit the collected notification information comprises sending the notification information to an intermediate server that routes the notification information to the address.

45. A method of tracking access to electronic content, the method comprising:
creating a file that includes electronic content and causes access to the electronic content to be denied until notification information collected by executable instructions has been successfully transmitted;
transmitting the file to at least one address; and
receiving notification information from a successive recipient other than that of the immediate sender of the electronic content.

46. The method of claim 45, wherein transmitting the file comprises transmitting the file by e-mail.

47. The method of claim 45, wherein receiving notification information comprises receiving notification information collected from an address other than an address in the set of addresses.

48. The method of claim 45, wherein creating the file comprises receiving a password that protects the electronic contents.

49. The method of claim 45, wherein creating the file comprises receiving identification of the electronic content for inclusion in the file.

50. The method of claim 45, wherein creating the file comprises compressing the electronic content.

51. The method of claim 50, wherein creating the file comprises including information in the file needed to decompress of the compressed electronic content.

52. The method of claim 45, wherein creating the file comprises encrypting he electronic content.

53. The method of claim 52, wherein creating the file comprises including information in the file needed to decrypt the encrypted electronic content.

54. The method of claim 52, wherein encrypting the electronic content comprises encrypting the electronic content using a password as encryption key.

55. The method of claim 45, wherein creating the file comprises determining an address that receives the notification information.

56. The method of claim 45, wherein creating the file comprises receiving a password that protects the electronic contents;
receiving identification of the electronic contents for inclusion in the file;
compressing the electronic contents;
encrypting the electronic contents according to the received password; and
determining an address that receives the notification information.

57. A computer-implemented method of regulating access to e-mail, the method comprising:
detecting an attempt by a message recipient to access received e-mail; and
attempting to collect notification information from the recipient and any successive recipient other than that of the immediate sender of electronic content,
wherein executable instructions collect the notification information and attempts to transmit notification information to an address when triggered by an event, the executable instructions denying access to the electronic content until the notification information is transmitted.

58. The method of claim 57 in which access to the e-mail is granted if the attempted collection is successful and access to the e-mail is denied if the attempted collection is unsuccessful.

59. The method of claim 57 further comprising, if the attempt to collect notification information is successful, selectively granting access to the e-mail based on the content of the collected notification information.

60. The method of claim 57 further comprising, if the attempt to collect notification information is successful:
   attempting to transmit the collected notification information; and
   selectively granting access to the e-mail based on a result of the transmission attempt.

61. The method of claim 57 further comprising notifying an originator of the e-mail that access to the e-mail has been granted to the message recipient.

62. A computer program, disposed on a computer readable medium, for tracking electronic content, the computer program including computer program instructions for causing a computer to:
   produce a file that includes electronic content, and executable instructions that collect notification information from successive recipients, and attempt to transmit the notification information to an address other than that of the immediate sender of the electronic content when triggered by an event, the executable instructions denying access to the electronic content until the notification information is transmitted successfully.

63. The computer program of claim 62, wherein the executable instructions further deny access until an access granting message is received in response to the successful transmission of notification information.

64. The computer program of claim 62, wherein the trigger event comprises an attempt to access the electronic content.

65. The computer program of claim 62, wherein the executable instructions that transmit notification information comprise instructions that dynamically determine how to transmit the notification information via an intermediate device.

66. A computer program, disposed on a computer readable medium, for regulating access to electronic content, the computer program including instructions for causing a processor to:
   collect notification information from a recipient and successive recipients in response to an attempt to access the electronic content;
   attempt to transmit the collected notification information when triggered by an event to an address other than that of the immediate sender of the electronic content; and
   selectively grant access to the electronic content based on a result of the attempted transmission of the notification information,
   wherein executable instructions collect the notification information and selectively deny access to the electronic content until the notification information is transmitted.

67. The computer program of claim 66 in which access to the electronic content is granted if the attempted transmission is successful and access to the electronic content is denied if the attempted transmission is unsuccessful.

68. The computer program of claim 66 in which access to the electronic content is granted if the attempted transmission results in receipt of an access granting message and access to the electronic content is denied if the attempted transmission does not result in receipt of an access granting message.

69. The computer program of claim 66 in which access to the electronic content is denied if no notification information is collected.

70. The computer program of claim 66 in which the electronic content is included in an attachment to an e-mail message.

71. The computer program of claim 66, in which the attempt to transmit the collected notification information comprises sending the notification information to an address associated with an originator of the e-mail message.

72. The computer program of claim 66 in which the attempt to transmit the collected notification information comprises sending the notification information to an address other than an address associated with an originator of the e-mail message.

73. The computer program of claim 66 in which the attempt to transmit the collected notification information comprises sending the notification information to an intermediate server that routes the notification information to the address.

74. A method of tracking electronic content, the method comprising the steps of:
   producing an envelope that includes electronic content and executable instructions;
   sending the envelope by a sender to a first recipient;
   transmitting the envelope from the first recipient to one or more successive recipients; and
   transmitting notification information to another address other than an address from which the envelope was transmitted to the one or more successive recipients,
   wherein the executable instructions collects notification information from a computer of each successive recipient and attempts to transmit the collected notification information to the another address when triggered by an event, and
   wherein the executable instructions denies access to the electronic content at each successive recipient until one of an access granting message is received and the notification message is successfully transmitted.

75. The method of claim 74, further including the step of retransmitting the envelope from the one or more successive recipient to another successive recipient.

76. The method of claim 74, wherein the executable instructions grants partial access to the electronic content before an access granting message is received.

77. The method of claim 74, wherein the one or more successive recipient notification information includes at least one of successive recipient demographic attributes, successive recipient computer user identifier, summary of electronic content viewing, and successive recipient computer identifier.

78. The method of claim 74, wherein the triggering event includes one of attempting to access the electronic content, viewing the electronic content, using the electronic content, and listing the electronic content.

\* \* \* \* \*

UNITED STATES PATENT AND TRADEMARK OFFICE
CERTIFICATE OF CORRECTION

PATENT NO. : 6,751,670 B1
DATED : June 15, 2004
INVENTOR(S) : Patrick E. Patterson It is certified that error appears in the above-identified patent and that said Letters Patent is hereby corrected as shown below:

<u>Title page, Item [54], and Column 1 ,line 1,</u>
Title, delete "Component" and insert -- Content --.

Signed and Sealed this

Seventeenth Day of August, 2004

JON W. DUDAS
*Acting Director of the United States Patent and Trademark Office*